(12) United States Patent
Fullarton et al.

(10) Patent No.: US 8,325,906 B2
(45) Date of Patent: Dec. 4, 2012

(54) CLASS-BASED CALL REQUEST ROUTING

(75) Inventors: Paul Fullarton, San Jose, CA (US);
Tom Lichtenberg, La Honda, CA (US);
Michael Rothrock, San Jose, CA (US);
Steven D. Schramm, San Jose, CA
(US); Ankur Shah, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 550 days.

(21) Appl. No.: 11/698,705

(22) Filed: Jan. 25, 2007

(65) Prior Publication Data

US 2007/0201661 A1    Aug. 30, 2007

Related U.S. Application Data

(63) Continuation-in-part of application No. 10/890,922, filed on Jul. 14, 2004, now Pat. No. 8,041,020.

(60) Provisional application No. 60/487,143, filed on Jul. 14, 2003, provisional application No. 60/762,347, filed on Jan. 25, 2006.

(51) Int. Cl.
*H04M 7/00* (2006.01)

(52) U.S. Cl. ......... 379/220.01; 379/210.01; 379/211.01; 379/211.02; 379/219; 455/414.1

(58) Field of Classification Search ............. 379/210.01, 379/211.01, 211.02, 219, 220.01; 455/414, 455/414.1
See application file for complete search history.

(56) References Cited

U.S. PATENT DOCUMENTS

| | | | |
|---|---|---|---|
| 5,371,781 A * | 12/1994 | Ardon | 455/445 |
| 5,732,348 A | 3/1998 | Norimastsu | |
| 5,903,629 A | 5/1999 | Campbell | |
| 5,946,386 A * | 8/1999 | Rogers et al. | 379/265.09 |

(Continued)

FOREIGN PATENT DOCUMENTS

EP   1071295 A2   1/2001

(Continued)

OTHER PUBLICATIONS

PCT International Search Report, International Application No. PCT/US2006/033181, Apr. 25, 2007.

(Continued)

*Primary Examiner* — Ahmad Matar
*Assistant Examiner* — Khai N Nguyen
(74) *Attorney, Agent, or Firm* — Tucker Ellis LLP

(57) ABSTRACT

Communication systems and methods are described that include class-based call request routing. Components of the communication systems are configured to receive information of a class at a calling device. In response to the class information, a call request is automatically generated and addressed to resources of a class group. The resources of the class group all possess a common attribute of the class. The attribute includes one or more of a skill, job specialty code, job title, company, department, and division. The generated call request is routed to target devices of the resources. In response to a resource accepting the call request, a response message is received from a target device of the resource. Communications are established between the calling device and the at least one target device in response to the response message received from the target device.

67 Claims, 17 Drawing Sheets

U.S. PATENT DOCUMENTS

| | | | |
|---|---|---|---|
| 6,092,097 | A | 7/2000 | Suzouka |
| 6,147,977 | A | 11/2000 | Thro |
| 6,272,214 | B1 | 8/2001 | Jonsson |
| 6,345,288 | B1 | 2/2002 | Reed |
| 6,351,656 | B1 | 2/2002 | Burgan |
| 6,373,817 | B1 | 4/2002 | Kung |
| 6,404,860 | B1 * | 6/2002 | Casellini ............... 379/88.17 |
| 6,408,177 | B1 * | 6/2002 | Parikh et al. ............ 455/414.4 |
| 6,424,711 | B1 | 7/2002 | Bayless |
| 6,751,297 | B2 | 6/2004 | Nelkenbaum |
| 6,754,181 | B1 | 6/2004 | Elliott |
| 6,920,486 | B2 | 7/2005 | Kiiskinen |
| 2002/0055351 | A1 * | 5/2002 | Elsey et al. ............... 455/414 |
| 2002/0078150 | A1 * | 6/2002 | Thompson et al. ........... 709/204 |
| 2003/0032413 | A1 * | 2/2003 | Aksu et al. ................ 455/415 |
| 2003/0120593 | A1 | 6/2003 | Bansal |
| 2004/0248600 | A1 | 12/2004 | Kim |
| 2005/0041647 | A1 | 2/2005 | Stinnie |
| 2005/0068980 | A1 | 3/2005 | Mathew |
| 2005/0272413 | A1 | 12/2005 | Bourne |
| 2006/0141982 | A1 | 6/2006 | Timmins |
| 2007/0022058 | A1 | 1/2007 | Labrou |

FOREIGN PATENT DOCUMENTS

| | | | |
|---|---|---|---|
| EP | 1328109 A2 | 7/2003 | |

OTHER PUBLICATIONS

Written opinion of the International Searching Authority for Application No. PCT/US2006/033181.

PCT International Search Report, International Application No. PCT/US2006/033071, Apr. 20, 2007.

PCT International Search Report, International Application No. PCT/US2007/000487, Oct. 18, 2007.

PCT International Search Report, International Application No. PCT/US2007/007064, Jun. 30, 2008.

European Supplementary Search Report and Written Opinion dated Nov. 15, 2010.

* cited by examiner

| | |
|---|---|
| Alert ID | AC-1a |
| Purpose | Notifies receiver of Active Call request. |
| Type | Request |
| Originator | End User, Caller |
| Originator's phone no. | Caller defined at UI. Default is Caller's handset phone number |
| Display Text | N/A |
| Priority | Caller defined at UI |
| Text subject | Caller defined at UI |
| Voice subject | Caller defined at UI |
| Expiration | Caller defined at UI as [HH:MM, or wall clock time]. Default is 180 minutes |
| Response Options | 1. Accept call request with recipient's handset phone number (this is the default response)<br>2. Accept call request with phone number input by recipient<br>3. Initiate mobile call to originator using the value in the originator's phone number field<br>4. Postpone<br>    a. 15 minutes<br>    b. 60 minutes<br>    c. User defined interval<br>    d. User defined wall clock time<br>5. Respond with predefined text message<br>6. Initiate a Voice IM to originator<br>7. Delete |

FIG.7

| | |
|---|---|
| Alert ID | AC-1b |
| Purpose | Informs caller that recipient has accepted his Active Call request. |
| Type | Response |
| Originator | End User, Recipient |
| Display Text | N/A |
| Priority | N/A |
| Text subject | AMC generated message: "<recipient's name> accepted your call request at <time recipient responded>". |
| Voice subject | N/A |
| Expiration | Expiration time of associated AC-1a message. |
| Recipient's number | Phone number provided by AC-1a recipient |
| Response Options | 1. Initiate mobile call (using the value in the recipient's number field)<br>2. Delete |

FIG.8

| | |
|---|---|
| Alert ID | ON-1a |
| Purpose | Active call request to a non-AMC person. |
| Type | Request |
| Originator | AMC subscriber |
| Display Text | N/A |
| Priority | Caller defined at UI |
| Text subject | Caller defined at UI |
| Voice subject | N/A |
| Expiration | Caller defined at UI as [HH:MM] not to exceed 72 hours. Default is 3 hours. |
| Phone number | Caller defined at UI. Default is originator's mobile handset phone number. |
| Response Options | N/A |

FIG.9

CLASS-BASED CALL REQUEST ROUTING

RELATED APPLICATIONS

This application is a continuation-in-part (CIP) application of U.S. patent application Ser. No. 10/890,922, filed Jul. 14, 2004, now U.S. Pat. No. 8,041,020 which claims the benefit of U.S. Patent Application No. 60/487,143, filed Jul. 14, 2003.

This application claims the benefit of U.S. Patent Application No. 60/762,347, filed Jan. 25, 2006.

This application is related to U.S. patent application Ser. Nos. 11/509,109, 11/509,474, 11/509,113, 11/509,472, 11/509,127, 11/509,136, 11/509,144, and 11/509,494, all filed Aug. 23, 2006, and all of which claim the benefit of U.S. Patent Application Nos. 60/710,998, 60/711,051, and 60/711,053, all filed Aug. 23, 2005.

This application is related to U.S. patent application Ser. No. 11/651,223, filed Jan. 8, 2007, which claims the benefit of U.S. Patent Application No. 60/756,686, filed Jan. 6, 2006.

TECHNICAL FIELD

The disclosure herein relates generally to communication systems and, in particular, to wireless communication systems.

BACKGROUND

Mobile communications in today's real-time enterprise can be challenging. The problem is further complicated by changes in the workplace which have led to a more geographically dispersed and highly mobile workforce. In spite of the popularity of electronic mail (email), large numbers of people and employees still depend upon numerous other types of communications to collaborate with colleagues and drive business success. This is especially true for those in sales, service, operations and management roles who rely upon timely access to and coordination with colleagues as well as other employees, customers, partners and suppliers. Thus, communications remain an essential means of conducting business and staying in contact.

As a result of communications being so critical to business today, many professionals and enterprise employees now handle very large numbers of communications each business day. These communications can include disparate types of communications like emails, voicemails, instant messaging to name a few. Managing these large numbers and disparate types of communications consumes large amounts of time during the typical business day. For the growing number of people who spend a significant part of their day away from their offices or in meetings or other events, managing this large number of communications is highly time-consuming, frustrating and inefficient. Consequently, there is a need for communication systems that provide efficient, timely, and proactive real-time management of multiple types of communications.

Incorporation by Reference

Each publication, patent, and/or patent application mentioned in this specification is herein incorporated by reference in its entirety to the same extent as if each individual publication and/or patent application was specifically and individually indicated to be incorporated by reference.

BRIEF DESCRIPTION OF THE DRAWINGS

FIG. 7 is a template of the Notification of Active Call Request alert message (AC-1$a$), under an embodiment.

FIG. 8 is a template of the Notification of Active Call Request Acceptance alert message (AC-1$b$), under an embodiment.

FIG. 9 is a template of the Active Call Request to a Non-Subscriber (ON-1$a$), under an embodiment.

DETAILED DESCRIPTION

Figure 1:
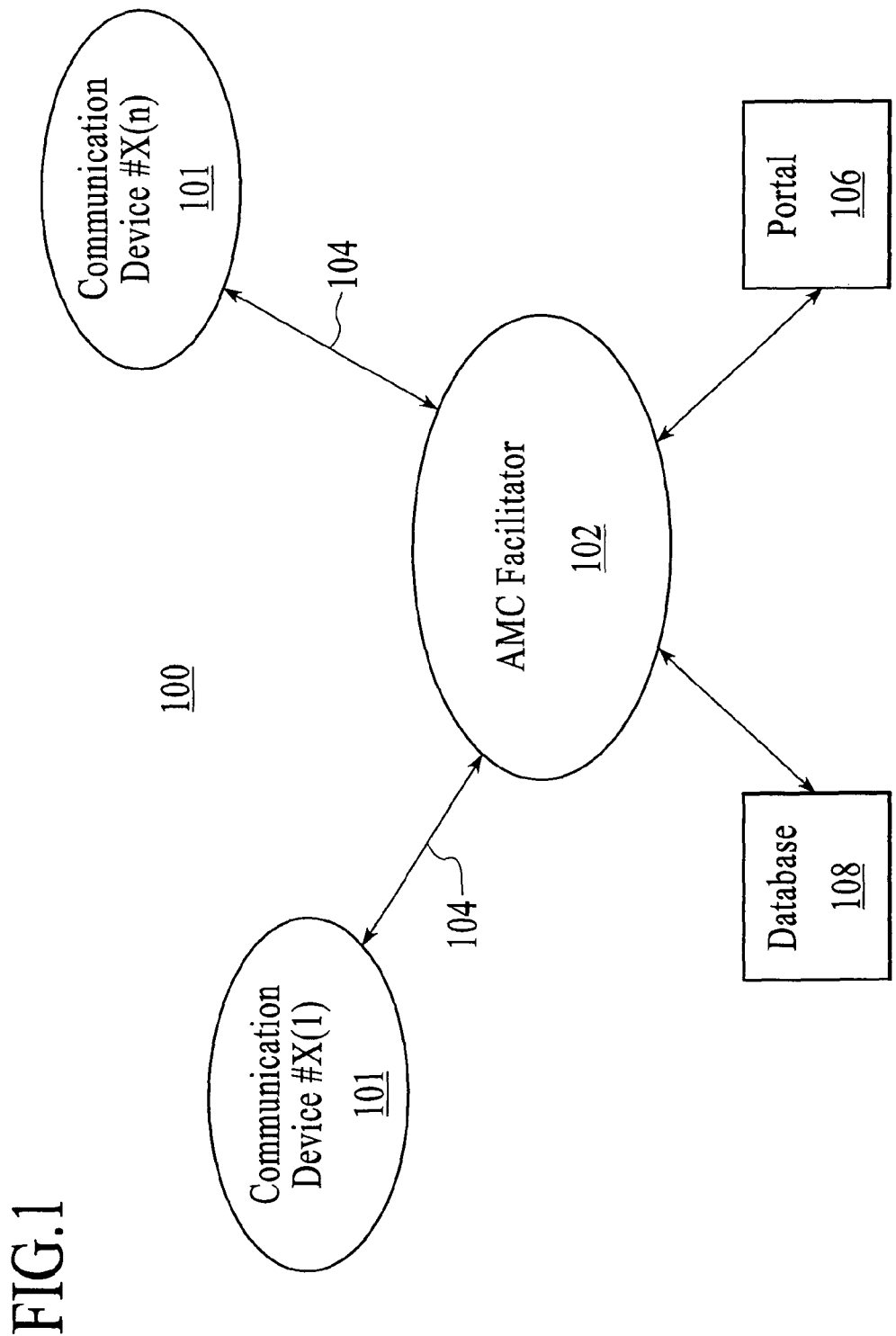
FIG. 1 is a block diagram of an active mobile collaboration (AMC) system, under an embodiment.

Communication systems and methods are described herein that include class-based call request routing. The communication systems described herein are configured to receive information of a class at a calling device. The class information can be received via a user input at the calling device. In response to the class information, a call request is automatically generated and addressed to resources of a class group. The call request is also referred to herein as an Active Call Request. The resources of the class group all possess a common attribute of the class. The attribute includes one or more of a skill, job specialty code, job title, company, department, and division. The generated call request is routed to target devices of the resources. In response to a resource accepting the call request, a response message is received from a target device of the resource. Communications are established between the calling device and at least one target device in response to the response message received from the target device. In this manner, a user can efficiently establish communications with another individual or resource having particular information desired by the user.

In the following description, numerous specific details are introduced to provide a thorough understanding of, and enabling description for, embodiments of the communications systems. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

The communication systems described herein use loosely-coupled client-server architectures to improve the efficiency of multiple types of communications. The communication systems, referred to herein as the active mobile collaboration (AMC) system, include a client application and a facilitator application. The client application, also referred to as the client or AMC client, is a component application of a variety of processor-based mobile communication devices and telephones.

The facilitator application of an embodiment, also referred to as the facilitator or AMC facilitator, is an application hosted on one or more servers or other processor-based devices. The facilitator communicates with a portable or mobile communications device via one or more couplings and the client hosted on the communications device. The facilitator communicates with the AMC client of a host portable device via a network coupling for example. The facilitator of alternative embodiments can be distributed among one or more portable processor-based devices including the same communication devices as the client application.

The components of the AMC system function to improve efficiency of communications by allowing communication device users to increase accessibility of enterprise and personal contact information from mobile phones and other personal digital assistants (PDAs), dynamically manage how and when mobile communications take place, intelligently screen messages, regardless of message type, based on identity of a messaging party, urgency, and subject matter, and determine which contacts in a directory are available to talk and which ones choose not to be disturbed, to name a few.

FIG. 1 is a block diagram of an active mobile collaboration (AMC) system 100, under an embodiment. The AMC system 100 includes any number X(n) of communication devices 101 coupled for communication via one or more facilitators 102 and one or more couplings 104. One or more of the communication devices 101 include an AMC client application. Likewise, the facilitator 102, also referred to herein as the AMC server 102, includes a facilitator application. The AMC client and facilitator function to allow users of the communication devices to dynamically manage how, when, and with whom mobile calls take place, intelligently screen calls based on caller identity, urgency, and subject matter, determine which contacts in a directory are available to talk and which ones choose not to be disturbed, and increase accessibility of enterprise and personal information (e.g., voicemail, contacts, calendars, etc.) from mobile phones. The AMC system 100 of an embodiment also includes couplings with one or more portals 106 and/or one or more databases 108, but is not so limited.

The communication devices 101 and facilitators 102 described herein are processor-based components running or hosting numerous applications or programs. As such, the communication devices 101 and facilitators 102 can include one or more processors (not shown) coupled among any number/combination of components (not shown) known in the art, for example buses, controllers, memory devices, and data input/output (I/O) devices, in any number of combinations.

The communication devices 101 described herein include processor-based electronic devices, for example, cellular telephones, personal computers, portable computing devices, portable telephones, portable communication devices, subscriber devices or units, PDAs, mobile devices, wireless devices, wireline devices, voice over Internet Protocol (VOIP) devices, private branch exchange (PBX) devices, soft clients, and desktop clients to name a few. The communication devices 101, also referred to as handsets, client devices, mobile devices, mobile communication devices, and portable communication devices, can include all such devices and equivalents, and are not limited to the communication devices described above.

As described above, the AMC clients are hosted on or run on communication devices 101 or handsets. The AMC client is an application that runs under control of processors on a variety of off-the-shelf mobile devices and telephones, for example, supporting open application environments such as the Symbian OS™, QUALCOMM's Binary Runtime Environment for Wireless (BREW™), as well as other application environments available from Palm, Microsoft, and Sun Microsystems, but is not so limited. Users or subscribers can download and deploy the AMC client over the air and/or over wired connections; further, the AMC client can be pre-loaded in the memory of the host device, or displayed as a thin client (e.g., browser or web client).

The couplings 104 include wired couplings, wireless couplings, and hybrid wired/wireless couplings, but are not so limited. Furthermore, the couplings 104 can include various networks and/or network components (not shown) of a communication service provider or carrier, but are not so limited. The network and corresponding network components, when present in the couplings 104, can be any of a number of network types known in the art including, but not limited to, local area networks (LANs), metropolitan area networks (MANs), wide area networks (WANs), proprietary networks, backend networks, and the Internet. The coupling may be via a number of protocols including but not limited to Hypertext Transport Protocol (HTTP), Transmission Control Protocol (TCP), User Datagram Protocol (UDP), Session Initiation Protocol (SIP), and Wireless Application Protocol (WAP). Furthermore, the coupling may be via a number of messaging standards including but not limited to Multimedia Messaging Service (MMS), Short Message Service (SMS), and Enhanced Messaging Service (EMS).

Figure 2:
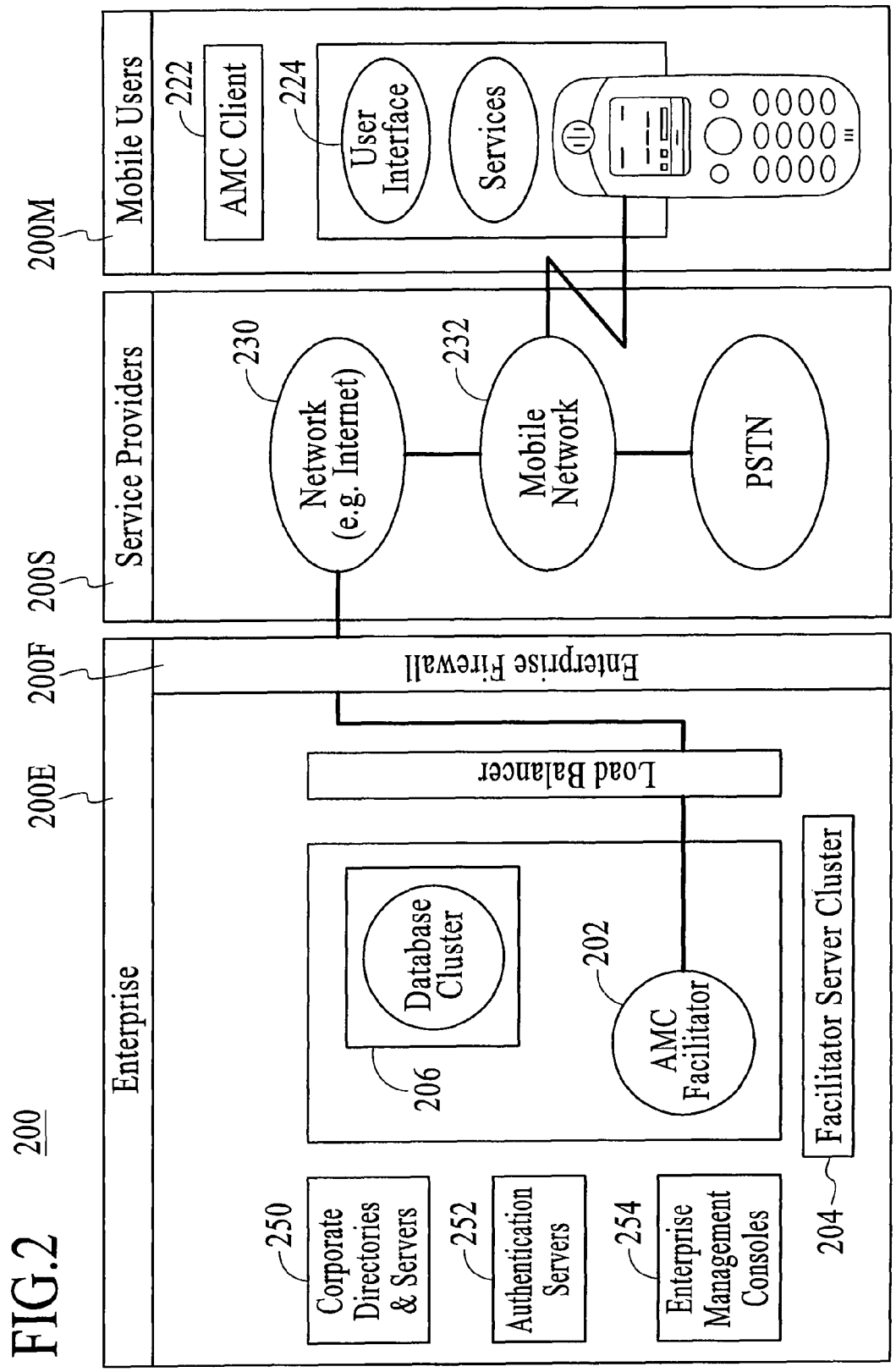
FIG. 2 is a block diagram of a communications system that includes an AMC system, under an alternative embodiment.

FIG. 2 is a block diagram of a communications system 200 that includes an AMC system, under an embodiment. The AMC system includes a facilitator 202 and a client 222 as described elsewhere herein. The facilitator 202 can be one or more facilitators that form a facilitator server cluster 204 and/or database cluster 206 within the enterprise 200E that are resident behind the enterprise firewall 200F, but the AMC system is not so limited. The host enterprise 200E also includes numerous other components, for example, corporate directories and servers 250, authentication servers 252, and enterprise management consoles 254 to name a few. The facilitator 202 is an integrated component of the host enterprise 200E and as such integrates with one or more components of the enterprise 200E. For example, couplings between the facilitator 202 and messaging and collaboration servers (e.g. Microsoft® Exchange) and/or corporate or other directories of the enterprise 200E allow easy, over-the-air download of personal and corporate contact information to devices, as well as searching of personal and corporate contact directories from the device. Other information of the enterprise 200E can also be delivered to the devices using the AMC system, information including but not limited to calendar information, calendar alerts, calendar reminders, etc.

The facilitator 202 couples to a device of one or more users via one or more network couplings. The facilitator 202 couples to one or more devices using one or more service provider networks 200S, as an example. In this example configuration, the facilitator 202 couples to one or more service provider networks or infrastructures 200S via network couplings 230 (e.g. Internet), and then couples to devices 200M via the respective service provider networks 232. The AMC system protects data transfers between the facilitators 202 and the devices 200M using secure couplings, for example, protected with end-to-end security protocols like Secure Sockets Layer (SSL) or Transport Layer Security TLS cryptographic protocols.

The devices 200M of an embodiment include the AMC client 222. The AMC client 222, also referred to as the client 222, includes a graphical user interface 224 that integrates with the device applications and allows users to receive and scan enterprise information of the enterprise 200E. The enterprise information includes voicemail information (e.g., voicemail messages), contact information, directory information, calendar information, alerts that can include calendar reminders, conference notifications and call requests from colleagues, as described herein and in the Related Applications. Call requests include relevant details such as name, urgency, and subject matter to help users move business forward while screening out unwanted interruptions. The client 222 further provides a presence-aware phonebook that lets users find a contact and determine if the contact is available to talk, even before placing a call. The client 222 eliminates the need to manually enter contacts into the host device 200M. Instead, users download personal and/or corporate contact information over-the-air to their devices. The facilitator 202 and client 222 of the AMC system therefore provide automated, two-way synchronization to ensure contacts are backed up and up to date at the enterprise 200E.

An example of the AMC system of an embodiment is available as the Orative Enterprise Software from Orative Corporation of San Jose, Calif. The facilitator is available as the Orative Enterprise Server (e.g. runs on a standards-based, Java 2, Enterprise Edition (J2EE) platform that operates securely behind the enterprise firewall). The client is available as the Orative Client Software (e.g. runs on a variety of popular mobile devices, and leverages the latest application development environments including Symbian OS, Java and BREW to name a few).

Components of the AMC system generally include intra-domain and inter-domain routers. These routers serve to route messages between AMC clients and facilitators, between different facilitators, or a specific functional module within a facilitator. The routers operate in an incoming mode and an outgoing mode. In the incoming mode (caller is the client interface layer) the routers receive commands from AMC clients and route them to a functional module based on the message type. In the incoming mode therefore the router acts like a simple router; it examines the message type and routes it to the appropriate functional module of a facilitator.

In the outgoing mode (caller is a server functional module) the routers receive outgoing commands and route them to either an AMC device, to another facilitator within the domain, or to another domain. The router uses the target username/domain pair of the message to determine the target server where: if the target domain is the same as its facilitator's domain, the router looks up the home facilitator of the target in a (database) table and assigns this value as the destination facilitator; and if the target domain is different from its facilitator's domain, the router assigns the value "amc.<domain name>" as the name of the destination facilitator.

There is always a destination facilitator for a message, even if the session of the message's target user has expired. The message is always routed to the user's home facilitator. If the home facilitator has failed, the message is instead routed to the user's backup facilitator. The assumption is that foreign domains don't have a single point of failure and can always receive the message.

If the destination facilitator is the originating facilitator, this indicates the message needs to be routed to one or more destination clients. The set of active destination devices for this user is found in a database table map (key is username and active flag; value is a set of destination device unique identifiers). A device is uniquely identified by a device ID and DNS name/IP address and port pair or phone number and carrier pair. The message is then placed in the user's queue and the rate controller per each active destination device is notified of the event.

In case of facilitator-to-facilitator routing, the message is placed in the facilitator's queue and the target facilitator's rate controller is signaled with the event. Facilitator-to-domain routing is identical to facilitator-to-facilitator routing.

Authentication ascertains the user identity for AMC client-facilitator and portal-facilitator communications and the server identity for facilitator-facilitator communication. User authentication of an embodiment is performed via an API of the facilitator, where the API supports many forms of authentication including basic username/password mechanisms to more complex challenge/response mechanisms, but the embodiment is not so limited.

While dynamically managing how and when mobile calls take place and intelligently screening calls based on numerous factors described above, the components of the AMC system also improve efficiency of voice communications by increasing accessibility of enterprise and personal contact information from mobile phones. Components of the AMC system of an embodiment support aggregation and management of contact information from various sources including, but not limited to, directories resident on desktop computers, corporate/enterprise directories, and contact information of the mobile device native phonebook, and provide data coupling between those sources and mobile devices hosting the AMC client, as described in the Related Applications. This contact information is managed by providing the user with access via the mobile device to dynamically integrated contacts of a contact list and a number of phonebooks from multiple sources. The dynamic integration of multiple disparate directories provided by the AMC system of an embodiment allows a user to indicate the contacts he/she desires among all directories of a corresponding enterprise server, and then dynamically synchronizes all enterprise directories so as to place the desired information from the directories together into a common AMC phonebook, as described in detail below. The integrated contact information available to the user can be used in class-based call request routing as described in detail below.

Figure 3:
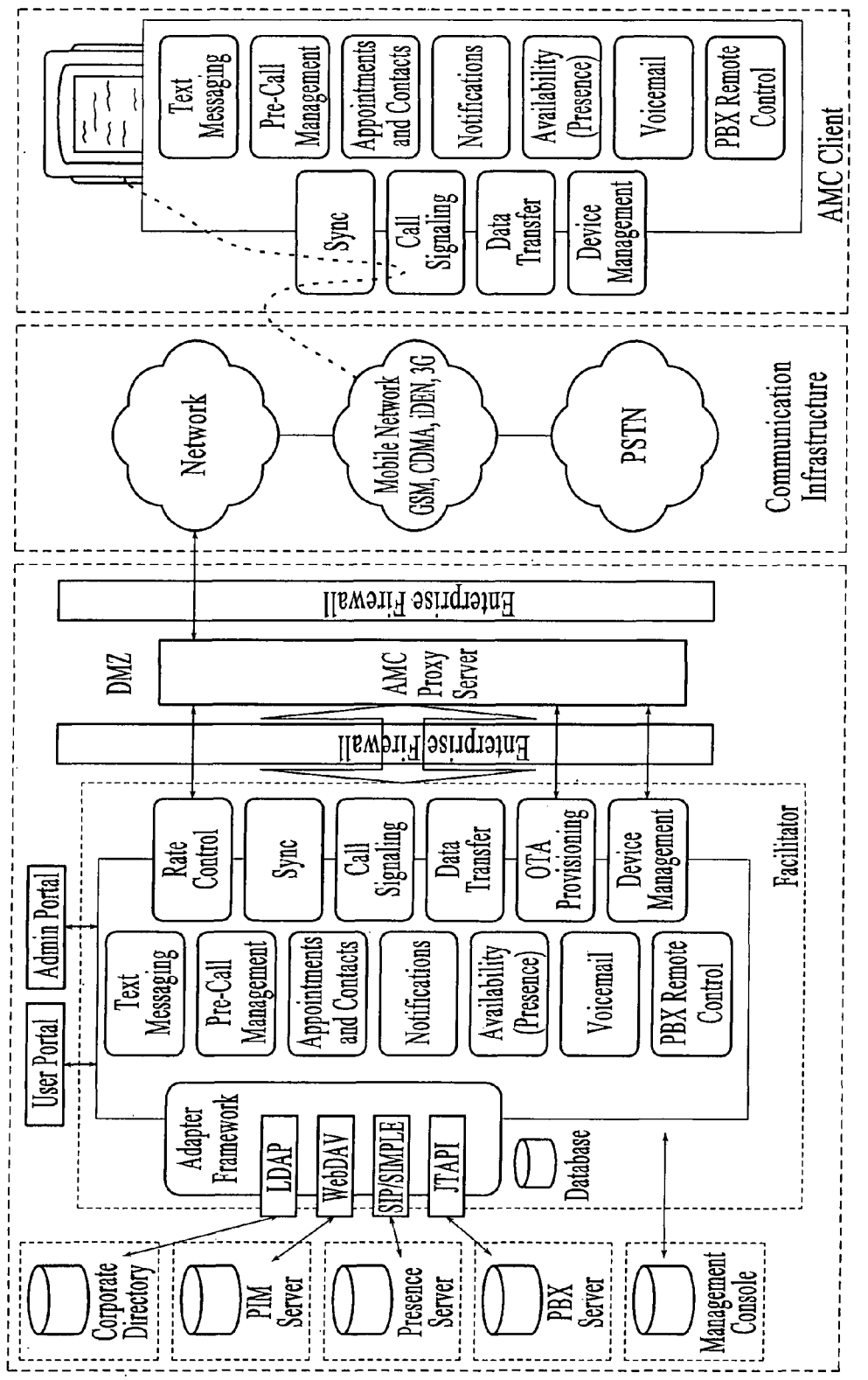
FIG. 3 is a block diagram of a communications system that includes an AMC system, under another alternative embodiment.

FIG. 3 is a block diagram of a communications system 300 that includes an AMC system, under an embodiment. The communications system 300 includes enterprise components, with which the AMC system is integrated, coupled to client devices via a communication or network infrastructure. The enterprise components include, but are not limited to, one or more of a corporate directory, Personal Information Manager (PIM) server, presence server, Private Branch Exchange (PBX) server, management console, and voicemail system (e.g., voicemail servers), to name a few.

The AMC system includes a facilitator as described herein. The facilitator includes an adapter or adapter framework by which the facilitator simultaneously integrates with components of the enterprise and enterprise servers. The facilitator uses an adapter for each enterprise component to which it integrates. The adapter of an embodiment is a protocol-specific adapter for each enterprise component to which it integrates; alternatively, the adapter includes vendor-specific adapters. The facilitator integrates with multiple components simultaneously. The AMC adapters convert the data from the enterprise components (e.g. external) into a common data structure.

The facilitator includes one or more applications that support multiple functions provided by the AMC system. The AMC system functions include integrated access to enterprise voicemail as described here and, additionally, text messaging, pre-call management, appointments and contacts, notifications, availability (presence), voicemail, and PBX remote control as described herein and in the Related Applications.

The facilitator couples to a client device of one or more users via one or more network couplings or infrastructures. As an example, the facilitator couples to a mobile network using a coupling with another communications network (e.g. Internet). The mobile network or mobile infrastructure, which includes one or more service provider networks associated with respective ones of the client devices, provides a coupling to individual client devices.

Communications between the facilitator and the client device are controlled by the facilitator using one or more components and applications. The functions provided by the facilitator in controlling communications include one or more of rate control, synchronization (sync), call signaling, data transfer, over the air (OTA) provisioning, and device management to name a few. Optionally, the communications path between the facilitator and the communications network includes an AMC proxy server.

The AMC system of an embodiment includes an Active Call Request (call request) that generally allows a caller to politely ask a receiver if the receiver can take or is ready to take a phone call, and provides discreet response options by which the receiver can provide timely feedback to the caller. Callers have the satisfaction of knowing the receiver acknowledged their call request and will make time to talk. When a user initiates a call request, the facilitator of the AMC system for example monitors the communication. When the message is delivered successfully, the facilitator sends the caller a delivery confirmation. If the receiver is not reachable (e.g., off the mobile network) the facilitator queues the request and delivers it as soon as possible. If the message can't be delivered before it expires, the facilitator notifies the caller that the request was undeliverable and explains why. In this way callers are never left wondering whether or not their message was delivered. The Active Call Request also provides discreet response options by which the recipient can provide timely feedback to the originator. Callers thus have the satisfaction of knowing the receiver acknowledged their call request and will make time to talk.

The AMC system, upon initiation of an Active Call Request, provides the originator various options to tailor the request to his/her unique situation and to provide more context to the intended recipient(s). Active Call Requests support numerous input options including class-based call request routing, priority, text subject, voice subject, originator's phone number, and expiration time to name a few. The text subject input option allows end-user keying of a text subject tag. An embodiment supports selection of pre-defined text subjects, and the portal supports definition of the pre-defined text subjects.

Options of the AMC system by which the originator of an Active Call Request tailors a request to a particular situation include class-based call request routing. The class-based call request routing of an embodiment generally routes a call request to those members of a class or group available to accept the call (as determined by the AMC system) and allows a message recipient that is a class member to indicate their willingness to accept the call before receiving the call, as described herein. The class-based call request routing of an embodiment defines a class or group of people based on a common attribute. The common attribute can be, for example, a skill shared by members of the group, or any other attribute or combination of attributes shared by group members, for example, a job specialty code, job title, company, department, and division to name a few.

Figure 4:
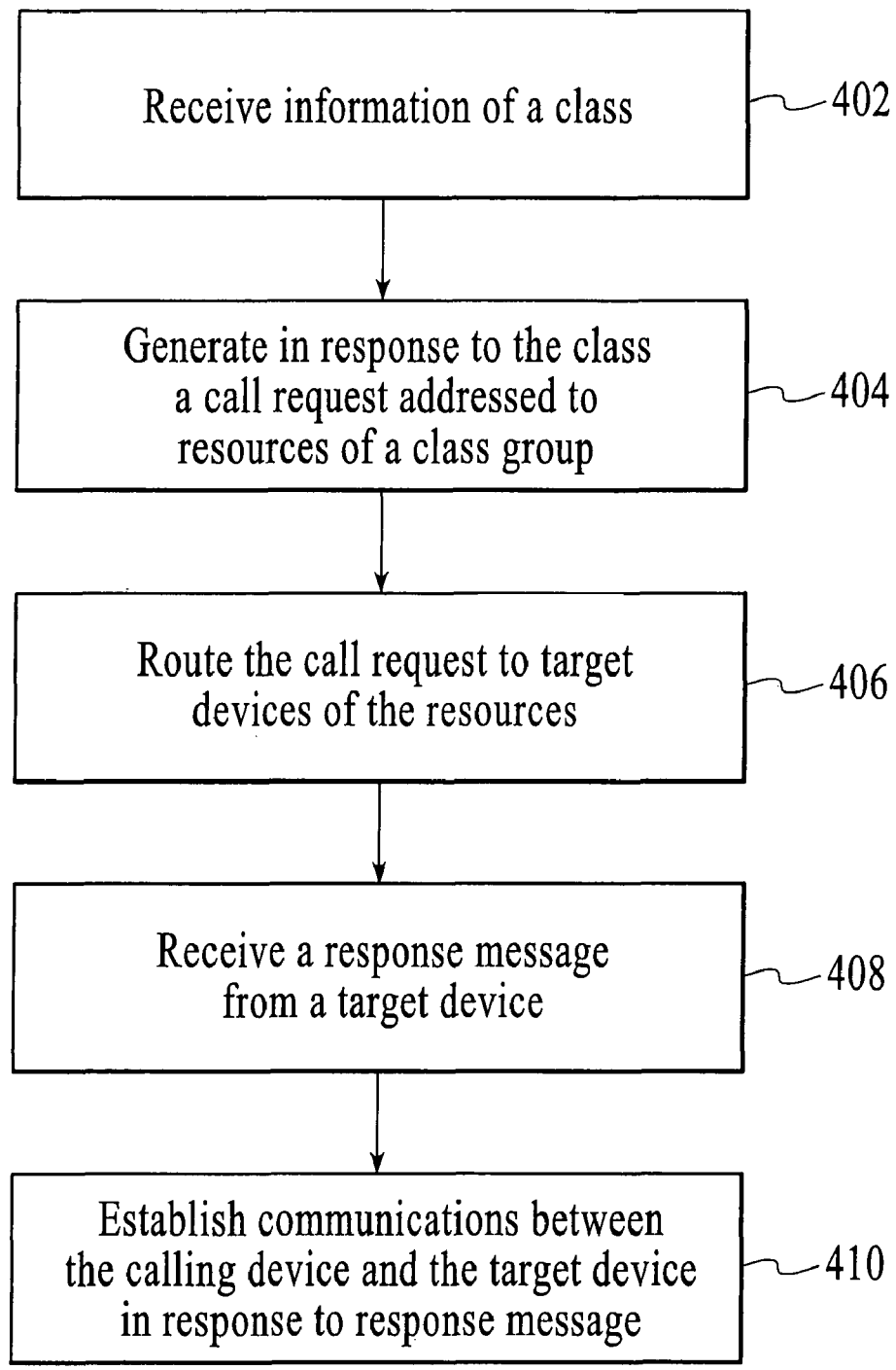
FIG. 4 is a flow diagram for class-based call request routing in a communication system, under an embodiment.

FIG. 4 is a flow diagram for class-based call request routing 400 in a communication system, under an embodiment. Components of the communication systems are configured to receive 402 information of a class at a calling device. In response to the class information, a call request is automatically generated 404 and addressed to resources of a class group. The resources of the class group all possess a common attribute of the class. The generated call request is routed 406 to target devices of the resources. In response to a resource accepting the call request, a response message is received 408 from a target device of the resource. Communications are established 410 between the calling device and the at least one target device in response to the response message received from the target device.

Figure 5:
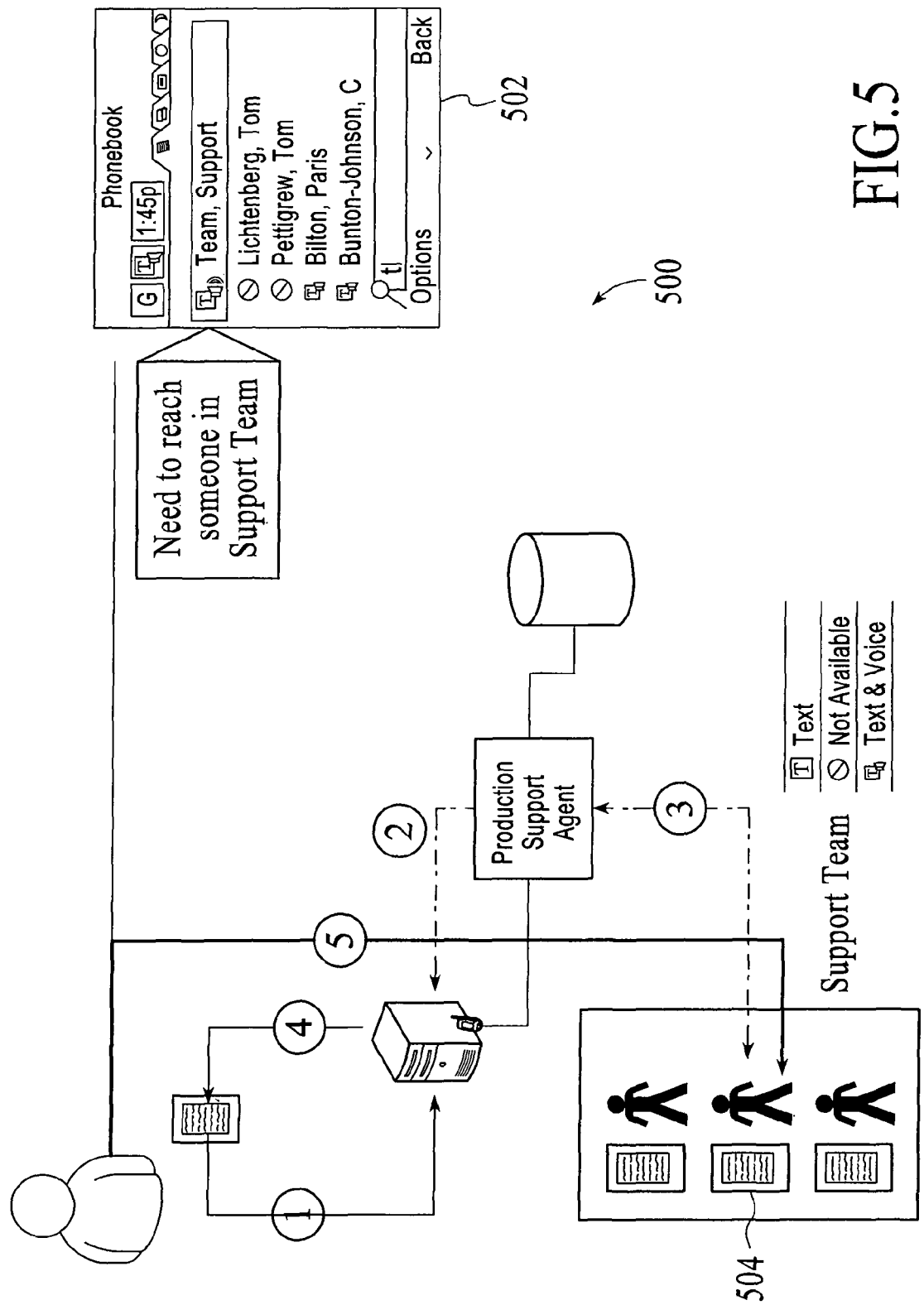
FIG. 5 is an information flow for class-based call request routing in an enterprise system, under an embodiment.

FIG. 5 is an information flow 500 for class-based call request routing in an enterprise system, under an embodiment. In this example, the originator of the message sends a call request to members of a group using skill-based call request routing, but the embodiment is not limited to skill-based routing. While membership in the group of this example is according to a skill (e.g., Support Team), group membership could be organized by any attribute (e.g., job title, company department/division, etc.) common to members of a group as determined by the originator when he/she configures or selects the groups using components of the AMC system described herein.

The originator of a call request in this example has a need to reach someone in the support team and initiates a call request and class-based call request routing by selecting 1 a skill-based group ("Team, Support") at their client device. Selection 1 of the skill-based group includes use of phonebook information displayed on the client device user interface 502 via one or more of the AMC client and facilitator as described above. The phonebook information can include one or more of personal contacts and various ones of enterprise contacts or phonebooks as described herein.

Upon selection of the skill-based group, the AMC system automatically routes 2 the call request to at least one resource or member ("Production Support Agent") of the selected group. The call request can be routed to any number of resources of the group, and the resources of the group are defined by one or more attributes of the resource being assigned to or included in the group. The routing is performed by one or more components or algorithms of the AMC system according to a routing scheme, as described below. A routing scheme of an embodiment determines a routing using information like availability, activity rate, sender preference or search criteria, and resource preference to name a few. As one example, the routing is to the first available, least recently used call request recipient of the group. If the recipient does not respond within a predetermined amount of time, the AMC system sends a call request to the next available call request recipient of the group. This process continues until a recipient accepts the call request. If no recipient accepts the request, the call request originator is notified of the situation. While the call request routing is sequential in this example, alternative examples or embodiments use parallel routing or more complex routing models (e.g., first try every member of group X, then broadcast call request message to every member of group Y), as described below.

When a resource of the group accepts the call request, using the user interface 504 of his/her client device, a response message is returned 3 indicating the acceptance. The response message or information of the response message is transferred 4 to the originator via the originator's client device. The originator can then initiate communication 5 directly with the responding resource.

The AMC facilitator includes an adapter or adapter framework by which the facilitator simultaneously integrates with components of the enterprise and enterprise servers, as described above with reference to FIG. 3. The facilitator uses an adapter for each enterprise component to which it integrates. The adapter of an embodiment is a protocol-specific adapter for each enterprise component to which it integrates; alternatively, the adapter includes vendor-specific adapters. As an example, the AMC adapters are used in the configuration of groups (classes) and group membership (resources). The AMC adapters can include a set of interfaces and utilities that receive or fetch and convert the data from one or more enterprise components into a common data structure. For example, the AMC adapters can receive information from external systems and use the received information to automatically generate and update configuration of groups and group membership to name a few. This AMC adapter configuration can leverage such external systems as human resource systems, financial systems, customer relationship management (CRM) systems, telephone systems (ACD, etc), directory servers, and email servers to name a few.

The call request routing described above includes rule-based routing. The rule-based routing includes the use of rules that can be customized on a group and/or class basis. The rules of an embodiment can be defined via static configuration or dynamic custom processes. A rule can be based on any number of dynamic data inputs, from any number of disparate systems. Further, a rule can trigger additional processes to run before, after, or during the call request routing.

The call request routing described above can be performed using a variety of routing schemes including, but not limited to, parallel routing, sequential routing, and combined parallel and sequential routing. For example, parallel routing can include simultaneous routing of the request to all resources of the selected group. Parallel routing can also include a first routing of the call request to at least one target device of a first set of resources simultaneous with a second routing of the call request to at least one target device of a second set of resources.

Sequential routing includes sequential routing to each of the resources of the class group. For example, the sequential routing includes a first routing of the call request to a first target device of a first resource, and a second or subsequent routing of the call request to a second target device of a second resource in response to a trigger condition (e.g., elapsed time, the absence of the response message to the first routing, etc.). One or more algorithms of the AMC system select an order of call request routing to resources of the class group. As another example, the sequential routing includes a first routing of the call request to at least one target device of a first set of resources, and a second routing of the call request to at least one target device of a second set of resources in response to a trigger condition (e.g., elapsed time, the absence of the response message to the first routing, etc.).

The routing of a subsequent call request under sequential routing of an embodiment occurs in response to a trigger condition but is not so limited. The trigger condition can be any condition selected by a user and/or provided by a host enterprise and includes, for example, expiration or termination of a time period since the first routing, receipt of a negative response from the preceding routing, and absence of a response message to the preceding routing to name a few.

The combined parallel and sequential routing includes parallel routing to a first set of resources of the class group, and sequential routing to each of a second set of resources of the class group. Similarly, the combined parallel and sequential routing includes sequential routing to each of a first set of resources of the class group, and parallel routing to a second set of resources of the class group. Additionally, the combined parallel and sequential routing includes parallel routing to a first set of resources of the class group followed sequentially by parallel routing to a second set of resources of the class group.

Resources of a group can be included or excluded from a routing scheme according to routing rules of the AMC system under rule-based routing of an embodiment. The routing rules are determined, for example, by an enterprise hosting the AMC system, and are controlled by one or more of the AMC facilitator and AMC client. The rule-based routing can include routing according to use status of the resource (e.g., routing first to relatively most-used resources, routing first to relatively least-used resources, etc.). The rule-based routing can also include routing according to skill level of the resource (e.g., routing first to relatively higher-skilled resources, routing first to relatively lower-skilled resources, etc.). Furthermore, the rule-based routing includes routing according to availability of the resource, where availability can be inferred by the system or set by the resource (e.g., routing first to available resources, etc.). Additionally, the rule-based routing includes routing according to one or more of class level of the resource and expense level of the resource.

Figure 6:
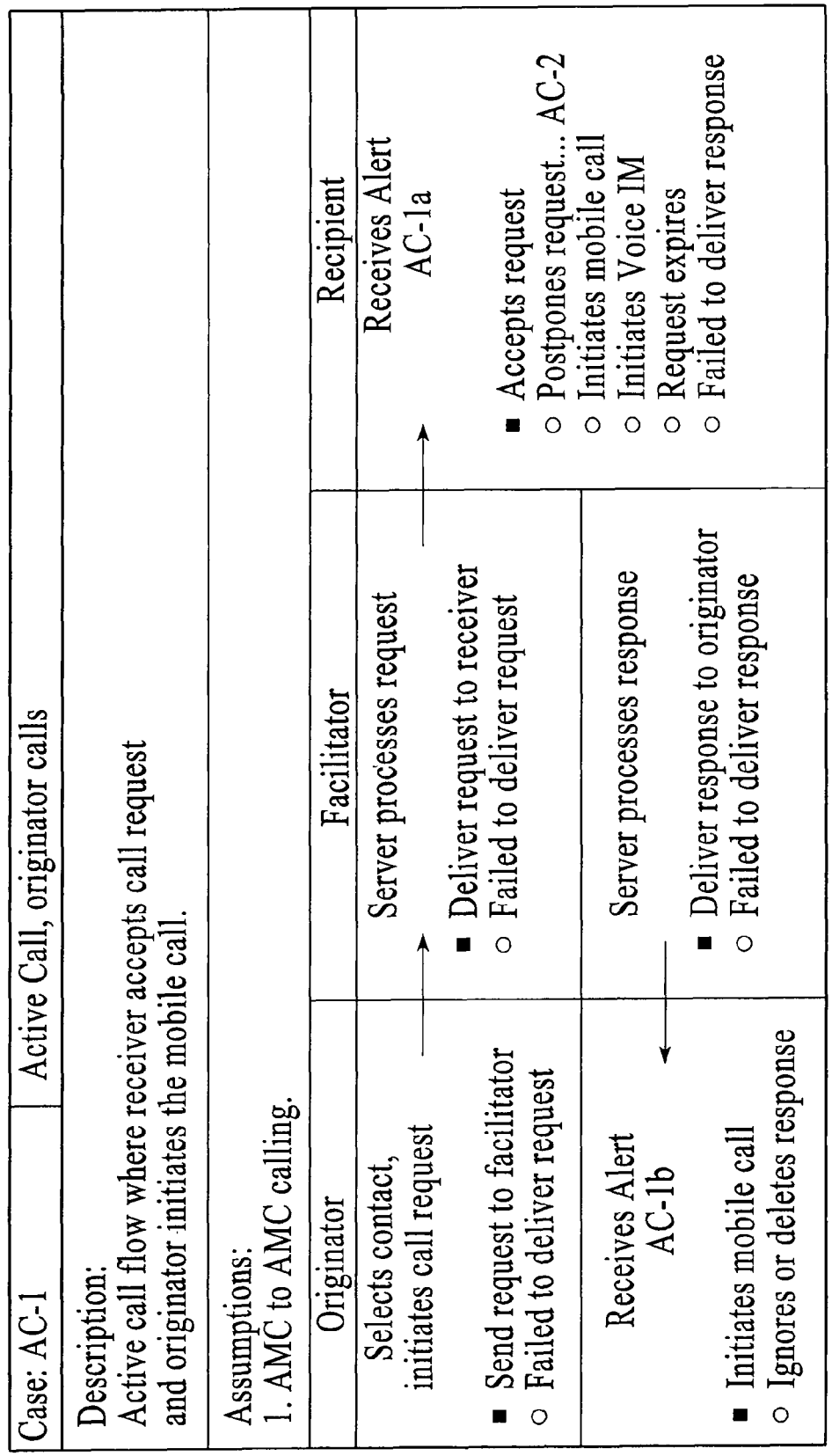
FIG. 6 is a flow diagram for an Active Call (AC), under an embodiment.

A call request generated under class-based call request routing is routed through the AMC system from an originator to one or more resources of a group. As an example, FIG. 6 is a flow diagram for an Active Call (AC), under an embodiment. An Active Call begins when an originator selects a contact and initiates an Active Call request to the contact using the originator's handset. The facilitator processes the call request and in response forwards an alert message to a handset of the selected contact, where the alert message is referred to herein as a Notification of Active Call Request alert message (AC-1*a*).

The flow diagrams provided herein include logic flows that start in the upper left-most cell and proceed to the right, then down, and back to the left, row-by-row (see arrows) until the lower left cell is reached. Arrows are used in the call flow to direct the flow for the reader. Generally, caller/originator behavior is always on the left, AMC facilitator behavior in the middle, and call recipient behavior on the right. Within the call flow the action taken by a party (originator and/or recipient) is shown followed by the possible responses (bulleted). The normal response course is designated with a solid bullet, and alternative courses are designated with hollow bullets.

FIG. 7 is a template of the Notification of Active Call Request alert message (AC-1*a*), under an embodiment. This alert message is sent to the recipients of an Active Call Request to inform the intended recipient that a caller wishes to speak with him, and provides convenient options for responding to the request. The recipients include resources or members of the class-based group selected by the originator, but are not so limited. The Notification of Active Call Request alert message supports a number of response options by the recipient including accepting the request with the recipient's handset phone number, accepting the request with a phone number input by the recipient, initiating the mobile call to the originator using the value in the originator's phone number field of the alert message, responding with a pre-defined text message, initiating a voice instant message to the originator, deleting the request, and requesting a postponement of the call. Actions by the recipient including accepting the call request, initiating the mobile phone call, responding with a pre-defined text message, and initiating a voice instant message to the originator result in automatic deletion of the alert message from the recipient's inbox, but the embodiment is not so limited. Further, information of delivery confirmation states of the Notification of Active Call Request alert message is provided to the originator.

The facilitator processes any response by the receiver and in response forwards an alert message to the originator, where the alert message is referred to herein as a Notification of Active Call Request Acceptance alert message (AC-1$b$). FIG. 8 is a template of the Notification of Active Call Request Acceptance alert message (AC-1$b$), under an embodiment. This alert message notifies the originator that the intended recipient of the Active Call Request has accepted the request and that the recipient is ready to participate in the call. Further, the Notification of Active Call Request Acceptance alert message provides the originator with response options that include a one-button mechanism for initiating a mobile call to the recipient, and an option to delete the alert message. Additionally, information of delivery confirmation states of the Notification of Active Call Request Acceptance alert message is provided by the facilitator to the receiver.

The AMC system described herein also supports class-based Active Call Requests by an originator/subscriber to a group resource that is a non-subscriber. The AMC system upon initiation of an Active Call Request by an originator (subscriber) to a recipient (non-subscriber) provides the originator various options to tailor the request to his/her unique situation and to provide more context to the recipient (non-subscriber). Active Call Requests to non-subscribers support numerous input options including priority, text subject, originator's phone number, and expiration time to name a few.

The originator's (subscriber) phone number input option supports originator (subscriber) keying of phone numbers and embedding of these phone numbers in the request alert. The default number is the originator's (subscriber) mobile phone number. The expiration time input option allows the originator (subscriber) to input an expiration time value at the handset to specify a time period after which the Active Call Request automatically expires.

Once generated, the active call request to the recipient (non-subscriber) is transferred to the originator's (subscriber) handset by the AMC system. The AMC system repackages contents of the Active Call Request into an SMS message directed at the mobile phone number of the recipient (non-subscriber). As one example, the SMS message is as follows: "<Originator name> at <phone number> is requesting to speak with you before <local expiration time>. <Priority>". Delivery confirmation states of the call request SMS message are provided to the originator (subscriber), and these states include at least one of "Not Sent", "In Transit", "Delivered", and "Delivery Failed". FIG. 9 is a template of the Active Call Request to a Non-Subscriber (ON-1$a$), under an embodiment.

Figure 10:
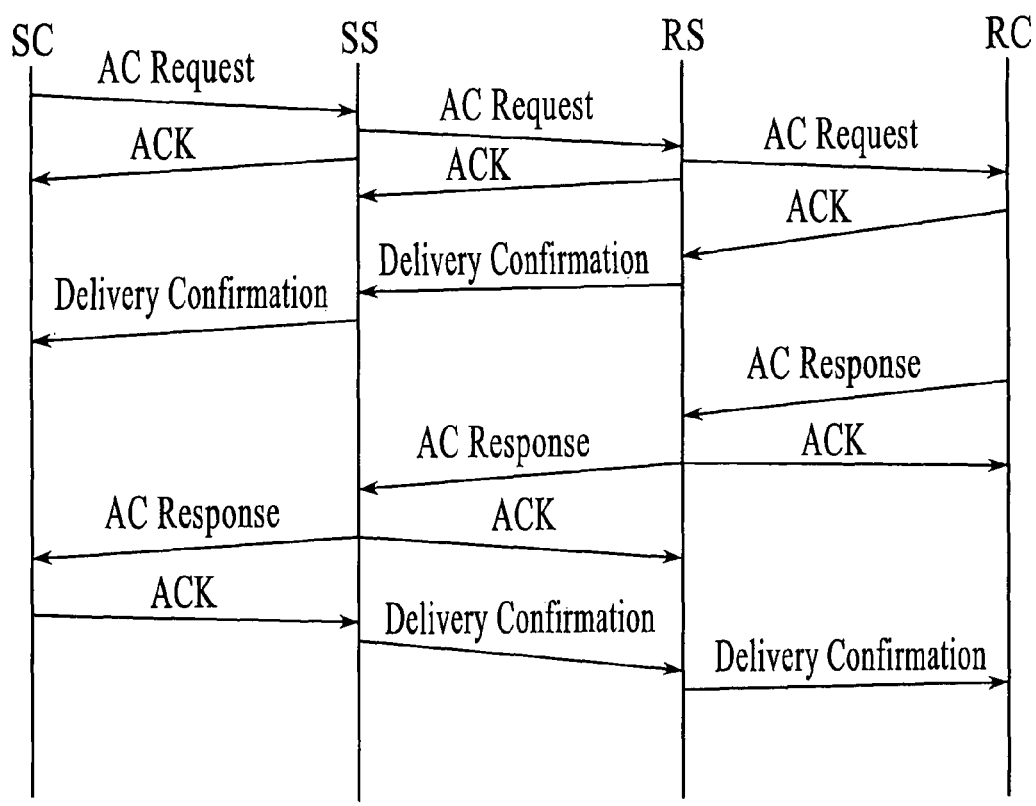
FIG. 10 is a message flow diagram for an active call flow, under an embodiment.

Considering the AMC system protocol, the Active Call flow described above with reference to FIG. 6 is revisited. FIG. 10 is a message flow diagram for an active call flow, under an embodiment. The active call flow includes three types of messages: Active Call Request (ACRequest); Active Call Response (ACResponse); and Delivery Confirmation (DeliveryConfirmation). An active call is initiated with an ACRequest; logically, it is sent by the Sender Client (SC) to the Recipient Client (RC); the SC and RC are both AMC clients hosted on separate handsets. When the RC receives the ACRequest, it sends a Delivery Confirmation back to the SC. The RC also may send an ACResponse, indicating acceptance or postponement of the corresponding ACRequest. When the SC receives the ACResponse, it also sends back a Delivery-Confirmation to the RC.

The SC and the RC of an embodiment do not communicate directly with each other but rather convey information via one or more facilitators hosted on one or more servers, where the servers are referred to as the Sender Server (SS) and the Recipient Server (RS). The SC connects to the SS while the RC connects to the RS. The SS and RS may be in the same domain or different domains.

To optimize client traffic and reduce bandwidth, Delivery Confirmations are not generated by the AMC clients themselves. Instead, the RS sends a Delivery Confirmation message when it receives the ACK from the AMC client.

Delivery Confirmations are automatically generated by the system, enabling the sender to know of the status of the message. Unlike a Delivery Confirmation, an Active Call Response message is only generated after user input, indicating a response to the active call request. The three components of active calls, Active Call Requests, Active Call Response, and Delivery Confirmations are each described in turn below.

Beginning with the Active Call Request, the SC generates a new Active Call Request message (ACRequest) for transmission to the SS. In response to the Active Call Request message, SS sends an acknowledgement message (ACK) to SC. The SS then sends an Active Call Request message (ACRequest) to RS, and RS responds by sending an acknowledgement message (ACK) to SS. The RS also sends an Active Call Request message (ACRequest) to RC. If RC is able to process the request message (ACRequest) from RS, then RC sends an acknowledgement message (ACK) to RS. During this Active Call Request call flow, if any Active Call Request message (ACRequest) remains undelivered and expiry is reached, then SC, SS (optional) and RS (optional) mark the status of the request as "failed to deliver" and each processing endpoint in the chain ceases to forward the request any further.

Continuing with the active call flow following the Active Call Request, the SC Active Call Response is a message generated on the handset by the recipient of the Active Call Request in response to the Active Call Request described above. The sender of an Active Call Request is the recipient of the Active Call Response, and the recipient of the Active Call Request is the sender of Active Call Response.

In response to receipt of the Active Call Request, and with continuing reference to FIG. 10, RC generates an Active Call response message (ACResponse). In response to receipt of the Active Call Request message (ACRequest), RS sends an acknowledgement message (ACK) to RC. In response to receipt of the acknowledgement message (ACK) RS sends an Active Call Response message (ACResponse) to SS. During the Active Call Response described herein if RC chooses to ignore the response message (ACResponse) and does not respond with a response message, then SC, SS, RS, and RC expire the response and set the status as "expired".

In response to receipt of the Active Call Response message (ACResponse) SS sends an acknowledgement message (ACK) to RS. In response to receipt of the acknowledgement message SS sends an Active Call Response message (ACResponse) to SC. During the Active Call Response described herein if RC chooses to ignore the Active Call Response message (ACResponse) and does not respond, then SC, SS, RS, and RC expire the response and set the status as "expired".

In response to receipt of the Active Call Response message (ACResponse) SC sends an acknowledgement message (ACK) to SS. During the Active Call Response if RC chooses to ignore the Active Call Response message (ACResponse) and does not respond, then SC, SS, RS, and RC expire the response and set the status as "expired". Furthermore, if the status of the Active Call Response message (ACResponse) remains "undelivered" and expiry of the Active Call Request message (ACRequest) is reached, then RC, RS, SS and SC mark the Active Call Request message (ACRequest) status as "expired"; if the Active Call Response message (ACResponse) status is "undelivered" and the status of the Active Call Request message (ACRequest) changes to "expired", an endpoint marks the Active Call Response message (ACResponse) as "expired".

Continuing with the active call flow following the Active Call Response, delivery confirmations are sent after both Active Call Requests and Active Call Responses. The sender of an active call request is the recipient of the active call response, and the recipient of the active call request is the sender of active call response.

Figure 11:
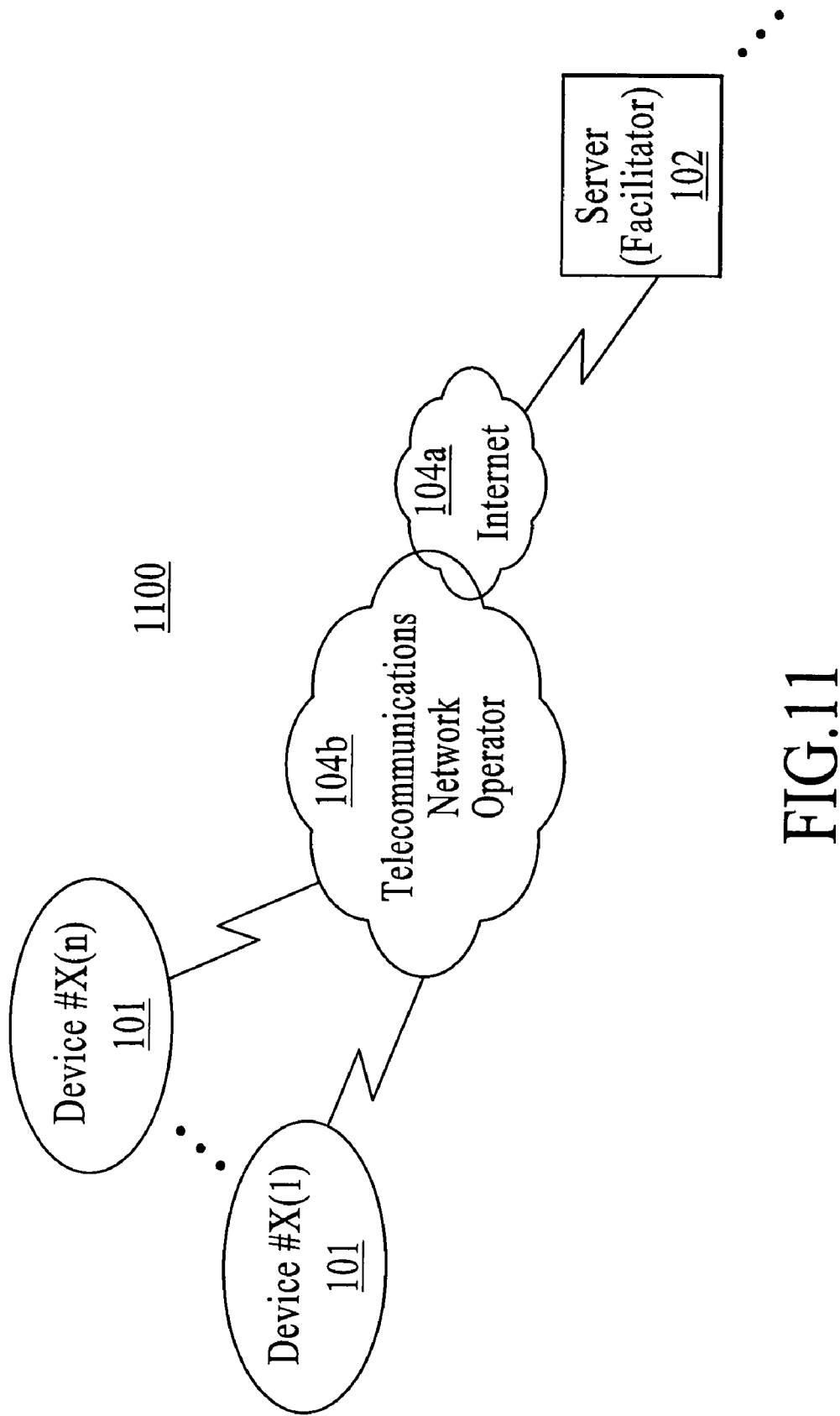
FIG. 11 is a block diagram of an AMC system, under an alternative embodiment.

In response to an Active Call Request, and with continuing reference to FIG. 10, RC sends a Delivery Confirmation message to SC, where RC is connected to RS (Recipient Server) and SC is connected to SS (Sender Server). A similar Delivery Confirmation message in response to the Active Call Response message is also possible. In response to receipt of the Delivery Confirmation message RS sends an acknowledgement message (ACK) to RC. In response to receipt of the acknowledgement message (ACK) RS sends a Delivery Confirmation message to SS. In response to receipt of the Delivery Confirmation message SS sends an acknowledgement message (ACK) to RS. In response to receipt of the acknowledgement message (ACK) SS sends a Delivery Confirmation message to SC. In response to receipt of the delivery confirmation message SC sends an acknowledgement message (ACK) to SS Some examples follow of alternative AMC system configurations that include the facilitator and client described above. FIG. 11 is a block diagram of an AMC system 1100, under an alternative embodiment. The AMC system 1100 includes a server or other processor-based device hosting the facilitator 102. The facilitator 102 communicates with one or more client devices 101 to provide AMC system functions among the client devices 101 via network couplings that include the Internet 104a and a telecommunications network 104b. The telecommunications network 104b includes, for example, a cellular telephone network or a public switched telephone network (PTSN), but can be other voice and data communication networks as known in the art. The cellular telephone network can use communication protocols that include, for example, Global System for Mobile communication (GSM), General Packet Radio Service (GPRS), Code Division Multiple Access (CDMA), and Time Division Multiple Access (TDMA), but are not so limited.

Figure 12:
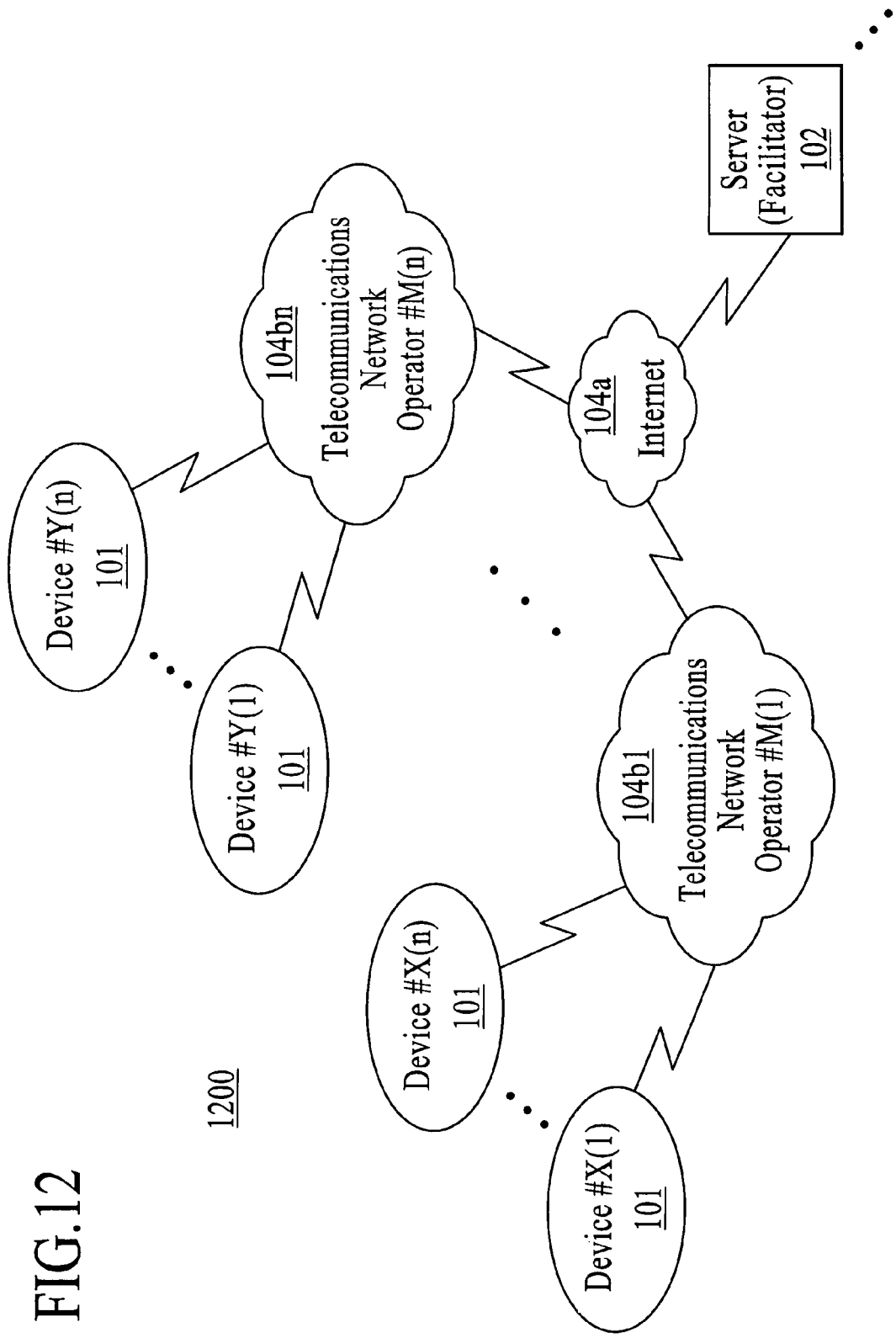
FIG. 12 is a block diagram of an AMC system, under another alternative embodiment.

FIG. 12 is a block diagram of an AMC system 1200, under another alternative embodiment. The AMC system 1200 includes a server hosting the facilitator 102, and the facilitator 102 communicates with one or more client devices 101 to provide AMC system functions among the client devices 101 via network couplings that include the Internet 104a and/or multiple telecommunications networks 104b1 to 104bn. The telecommunications networks 104b1-104bn are as described above, but are not so limited.

Figure 13:
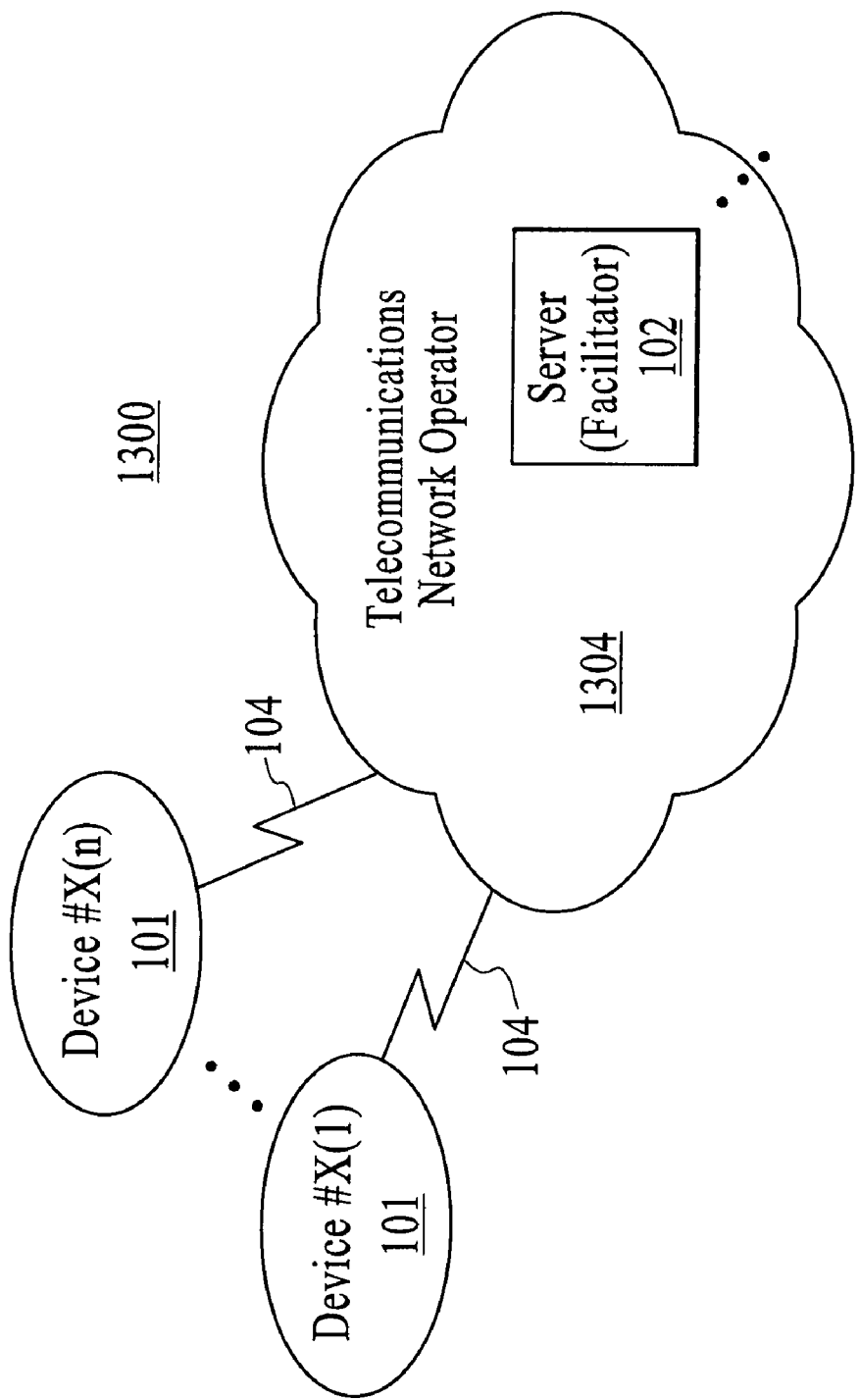
FIG. 13 is a block diagram of an AMC system, under yet another alternative embodiment.

FIG. 13 is a block diagram of an AMC system 1300, under yet another alternative embodiment. The AMC system 1300 includes a server hosting the facilitator 102, and the server/facilitator 102 is a component of a telecommunications network operator infrastructure. The facilitator 102 communicates with one or more client devices 101 to provide AMC system functions among the client devices 101 via network couplings 104, as described above, but is not so limited. In an alternative embodiment, the server/facilitator 102 may not be a component of a telecommunications network operator infrastructure. In another alternative embodiment, the server/facilitator 102 can be a component of one or more other network infrastructures.

Figure 14:
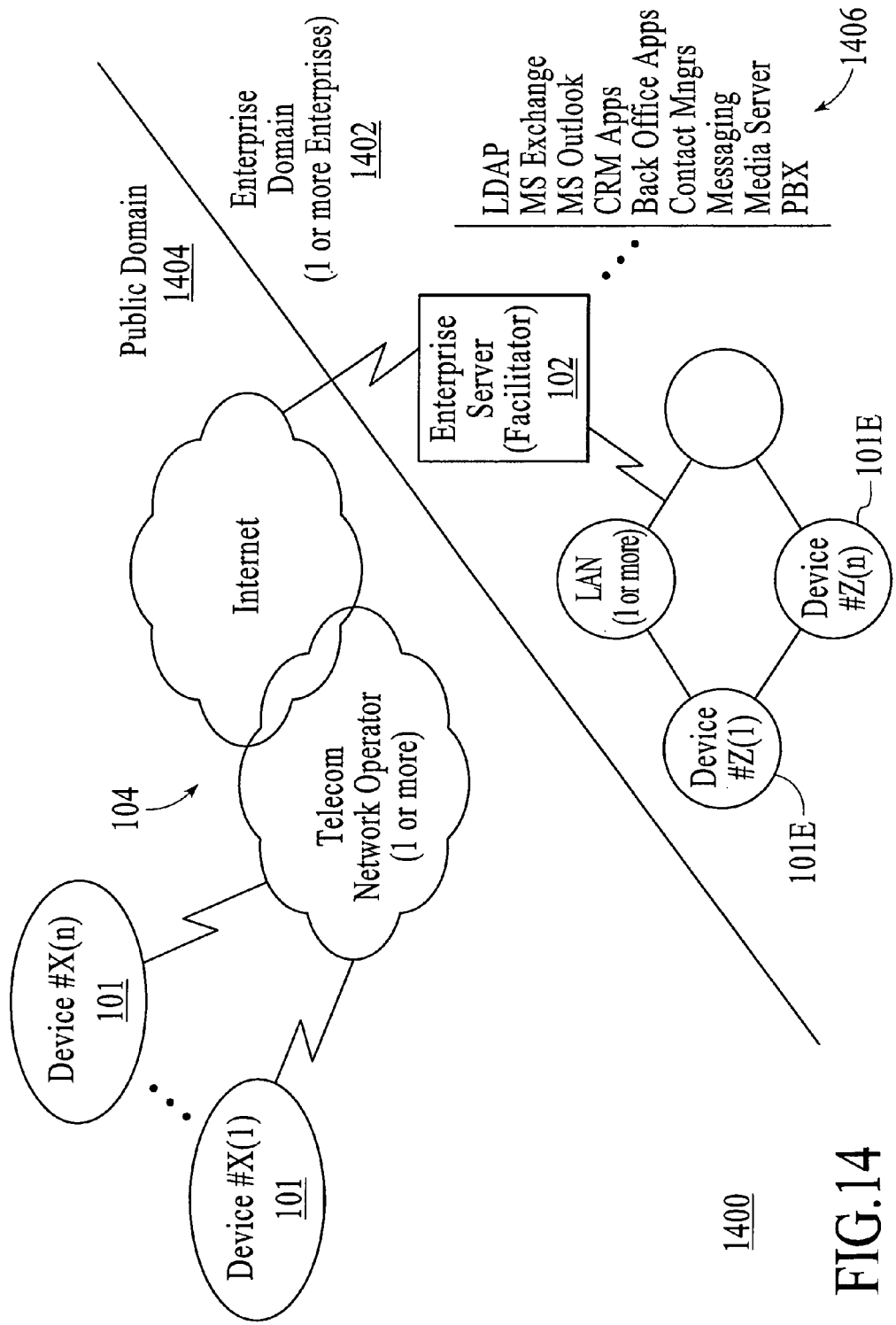
FIG. 14 is a block diagram of an AMC system in an enterprise domain, under another alternative embodiment.

FIG. 14 is a block diagram of an AMC system 1400 in an enterprise domain, under another alternative embodiment. The AMC system 1400 includes a server hosting the facilitator 102 where the server/facilitator 102 is a component of a corporate or enterprise infrastructure 1402. The server can host numerous additional applications 1406 in addition to the facilitator 102 or can be dedicated to the facilitator 102. The facilitator 102 communicates with one or more client devices 101 in the public domain 1404 to provide AMC system functions among the client devices 101 via network couplings 104. The network couplings 104 include, for example, the Internet and one or more telecommunication service provider infrastructures, but can include any number/type of couplings. The facilitator 102 also communicates with one or more client devices 101E in the enterprise domain 1402 to provide AMC system functions among the client devices 101E as described below. The client devices 101E in the enterprise domain 1402 are shown coupled to one or more LANs, but are not so limited.

Figure 15:
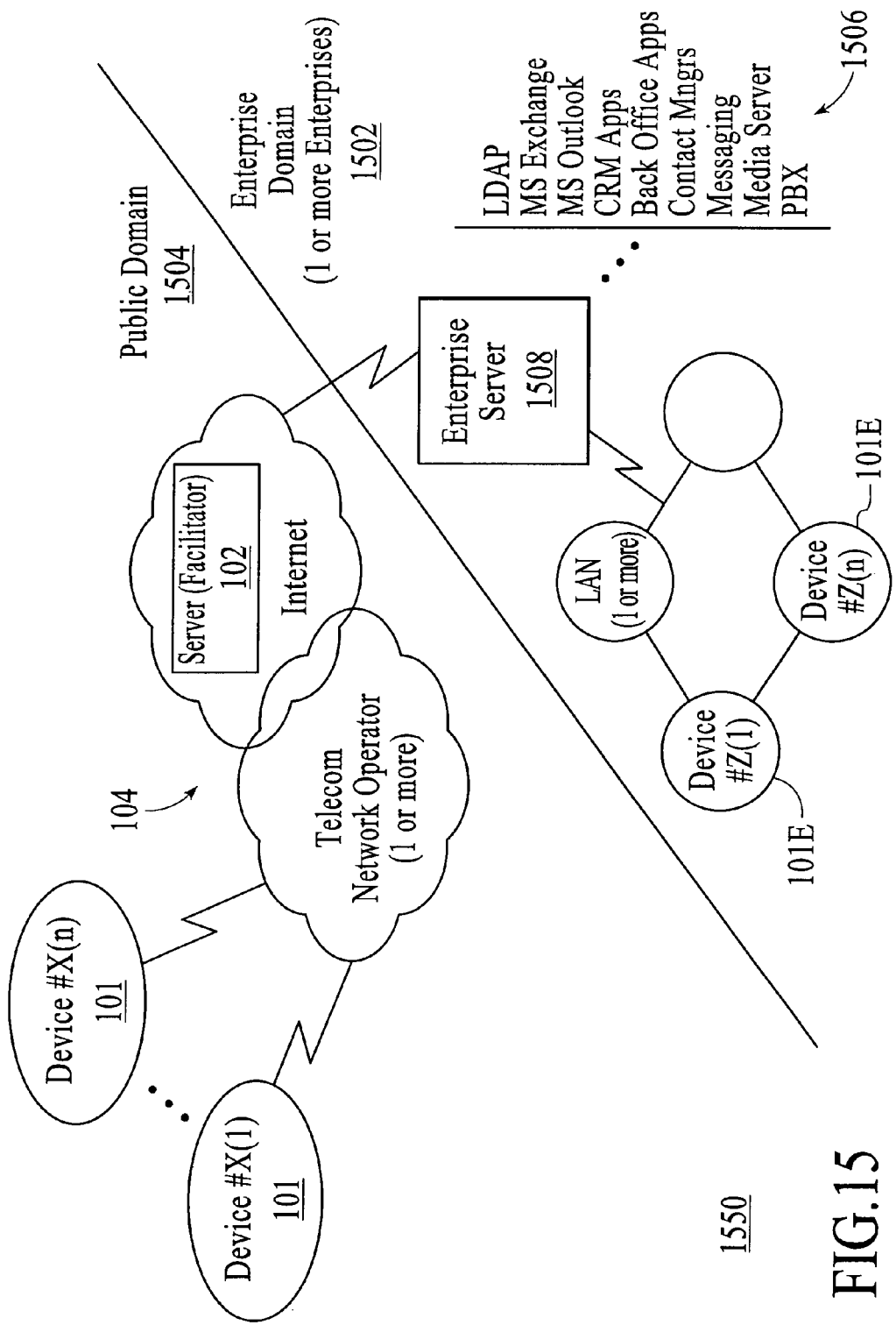
FIG. 15 is a block diagram of an AMC system in a public domain coupled across components of an enterprise domain, under another alternative embodiment.

FIG. 15 is a block diagram of an AMC system 1550 in a public domain coupled across components of an enterprise domain, under another alternative embodiment. The AMC system 1550 includes a server hosting the facilitator 102 where the server/facilitator 102 is a component of a carrier or service provider infrastructure or hosted data center infrastructure for example, but is not so limited. The facilitator 102 communicates with one or more client devices 101 in the public domain 1504 to provide AMC system functions among the client devices 101 via network couplings 104. The network couplings 104 include, for example, the Internet and one or more telecommunication service provider infrastructures, but can include any number/type of couplings. The facilitator 102 also communicates with components of the enterprise domain 1502 including, for example, one or more client devices 101E, one or more enterprise servers 1508, and one or more LANs. The facilitator 102 provides AMC system functions among the client devices 101E as described below. The client devices 101E in the enterprise domain 1502 are shown coupled to one or more LANs, but are not so limited.

As an alternative to the couplings of this AMC system 1500, the facilitator can be hosted on one or more servers (not shown) of the telecommunications network operator. The facilitator of the telecommunications network operator couples to the enterprise servers via local contact servers (not shown) and/or Virtual Private Network (VPN) couplings, but is not so limited.

Figure 16:
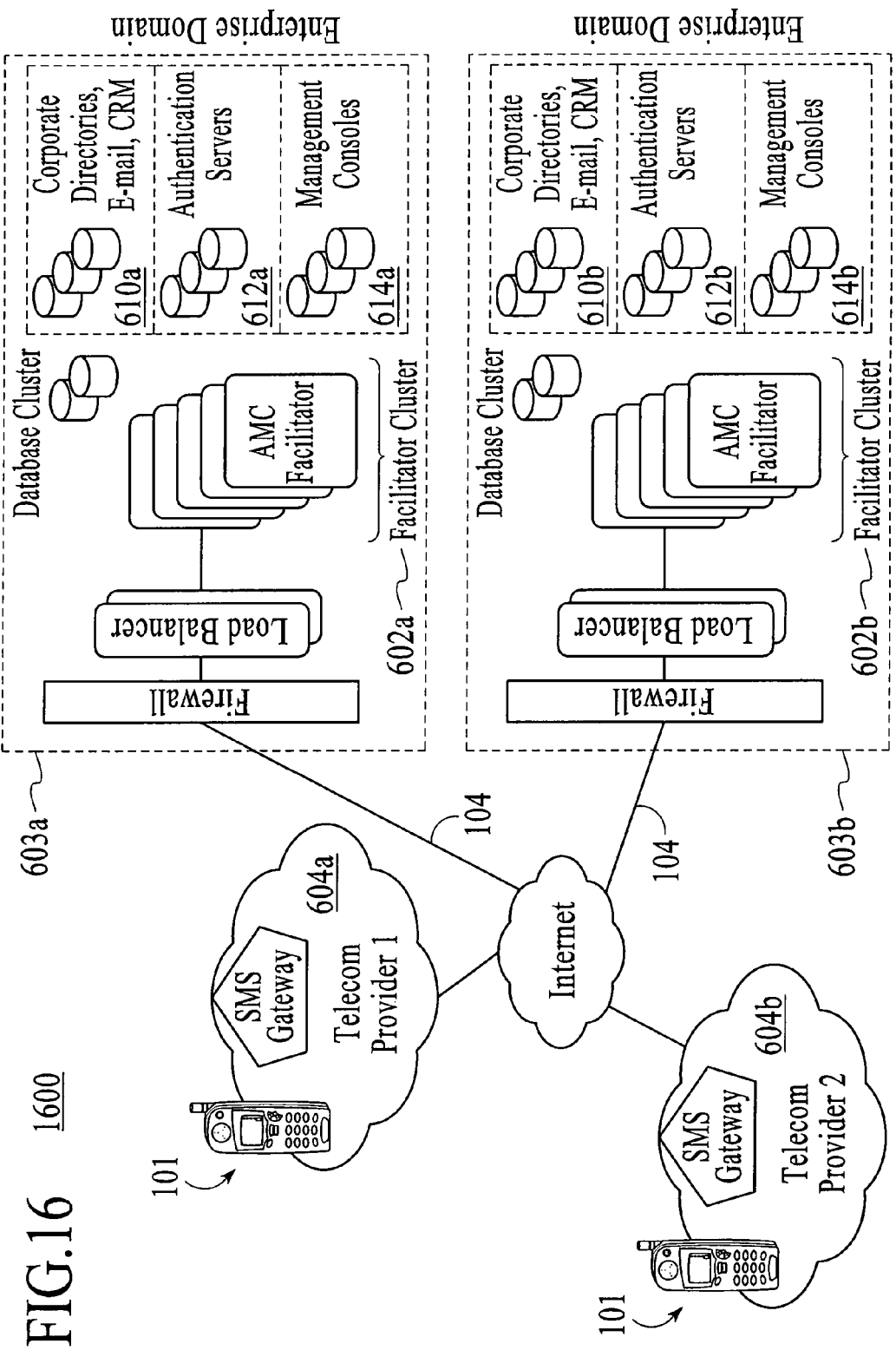
FIG. 16 is a block diagram of an AMC system in an enterprise domain, under still another alternative embodiment.

FIG. 16 is a block diagram of an AMC system 1600 in an enterprise domain, under still another alternative embodiment. The AMC system 1600 includes one or more facilitators that form facilitator clusters 602a and 602b within each of a number of enterprise domains 603a and 603b. Facilitators of the facilitator clusters 602a and 602b communicate with one or more client devices 101 to provide AMC system functions among the client devices 101 via network couplings 104. The network couplings 104 include, for example, at least one of the Internet and multiple telecommunication service providers 604a and 604b, but can include any number/type of couplings. The facilitators also couple with at least one of corporate directory servers and/or electronic mail (email) servers 610a/610b, authentication servers 612a/612b, and management consoles 614a/614b of the enterprise domains 603a/603b, but are not so limited.

Figure 17:
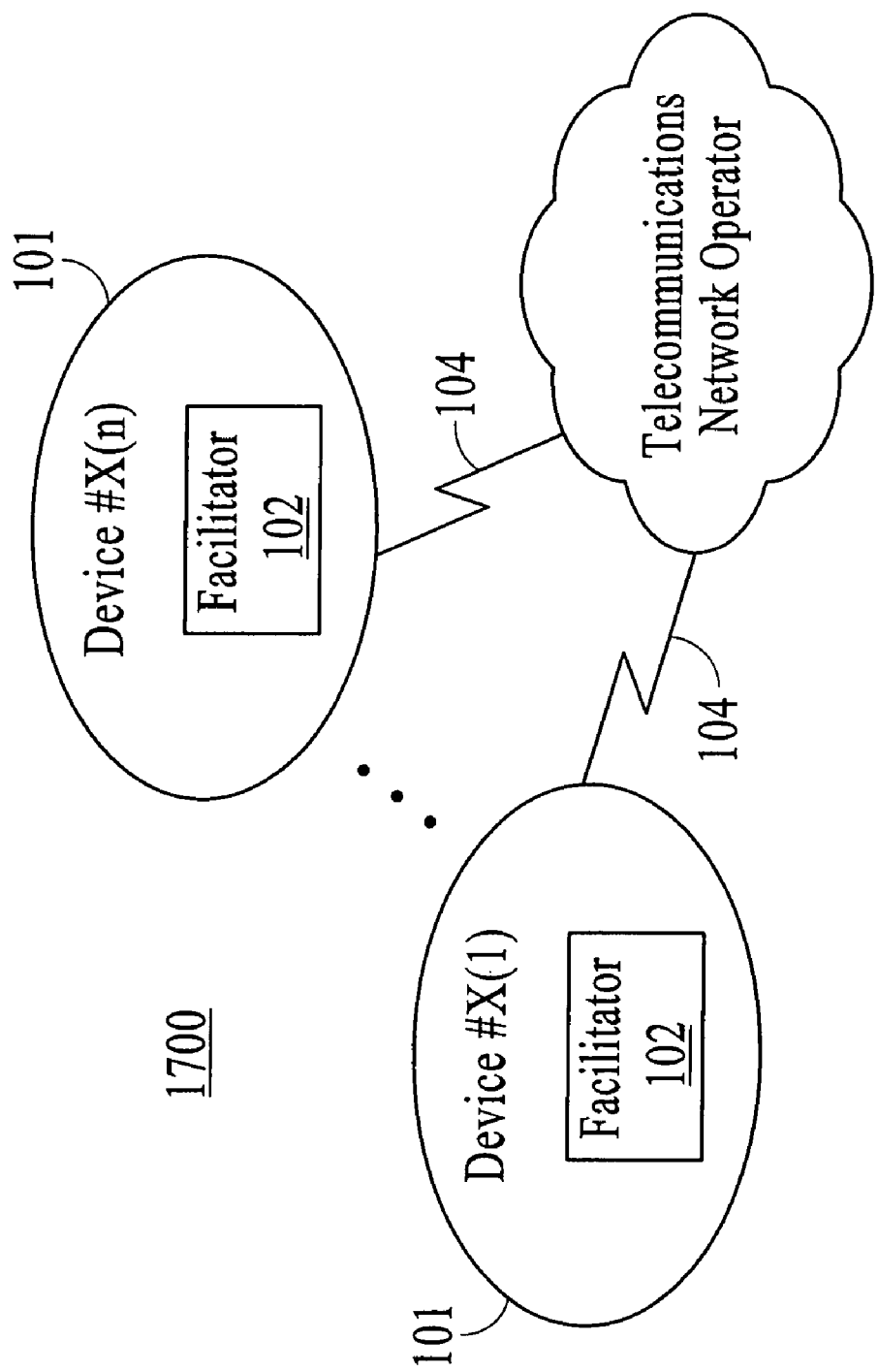
FIG. 17 is a block diagram of an active mobile collaboration (AMC) system, under an embodiment.

FIG. 17 is a block diagram of an active mobile collaboration (AMC) system 1700, under an embodiment. The AMC system 1700 includes any number X(n) of communication devices 101 coupled for communication via one or more facilitators 102 and one or more couplings 104. One or more of the communication devices 101 include an AMC client application. Additionally, one or more of the communication devices 101 include the facilitator 102. The AMC client applications and facilitator applications function to allow users of the communication devices to dynamically manage how and when mobile calls take place, intelligently screen calls based on caller identity, urgency, and subject matter, determine which contacts in a directory are available to talk and which ones choose not to be disturbed, and increase accessibility of enterprise and personal contact information from mobile phones, as described in detail below.

The AMC system components including the facilitator and AMC client described above function to allow users of the client devices or handsets like cellular telephones to quickly coordinate conversations, screen unwanted calls and interruptions and access enterprise directories. Specifically, the AMC system components increase call success rates by dynamically managing how and when mobile calls take place, let users intelligently screen calls based on caller identity, urgency and subject matter, quickly show which contacts are available to talk and which contacts choose not to be disturbed, reduce interruptions while encouraging urgently needed call-backs, and increase accessibility of enterprise and personal contact information from mobile phones.

Embodiments of class-based request routing as described and claimed herein include a method comprising: receiving at a calling device information of a class; generating in response to the class a call request addressed to resources of a class group, wherein the resources possess an attribute of the class; routing the call request to target devices of the resources; receiving a response message from at least one target device; and establishing communications between the calling device and the at least one target device in response to the response message.

In an embodiment, the information of a class includes a selection of a class made via the calling device.

In an embodiment, the class group includes one or more resources having one or more attributes in common.

In an embodiment, the method includes providing an integrated directory at the calling device.

In an embodiment, the integrated directory includes the class group.

In an embodiment, receiving information of the class includes receiving a class selection via the integrated directory.

In an embodiment, the integrated directory includes contact information of at least one of the resources.

In an embodiment, the method comprises determining the resources from a plurality of contacts of an enterprise, wherein the enterprise includes the resources.

In an embodiment, the routing is parallel routing to a plurality of resources of the class group.

In an embodiment, the routing includes: a first routing of the call request to at least one target device of a first set of resources; and a second routing of the call request to at least one target device of a second set of resources.

In an embodiment, the routing is sequential routing to each of a plurality of resources of the class group.

In an embodiment, the method comprises determining a hierarchy of the routing, wherein the hierarchy defines an order of the routing to the plurality of resources.

In an embodiment, the routing includes: a first routing of the call request to a first target device of a first resource; and a second routing of the call request to a second target device of a second resource in the absence of the response message to the first routing.

In an embodiment, the second routing occurs upon termination of a time period since the first routing.

In an embodiment, the routing includes: a first routing of the call request to at least one target device of a first set of resources; and a second routing of the call request to at least one target device of a second set of resources in the absence of the response message to the first routing.

In an embodiment, the routing comprises: parallel routing to a first plurality of resources of the class group; and sequential routing to each of a second plurality of resources of the class group.

In an embodiment, the attribute includes one or more of a skill, job specialty code, job title, company, department, and division.

In an embodiment, the routing includes rule-based routing.

In an embodiment, rules of the rule-based routing are customized according to on one or more of the class and the class group.

In an embodiment, the routing includes routing according to use status of the resource.

In an embodiment, the routing includes routing first to one of relatively most-used resources and relatively least-used resources.

In an embodiment, the routing includes routing according to class level of the resource.

In an embodiment, the routing includes routing according to expense level of the resource.

In an embodiment, the routing includes routing according to skill level of the resource.

In an embodiment, the routing includes routing first to one of relatively higher-skilled resources and relatively lower-skilled resources.

In an embodiment, the routing includes routing according to availability of the resource, wherein the availability includes one or more of presence of the resource, reachable status of the resource, availability determined by a host system, and availability specified by the resource.

In an embodiment, the generating of the call request includes generating the call request at the calling device.

In an embodiment, the method comprises providing a delivery confirmation to the calling device in response to delivery of the call request to the target devices.

In an embodiment, receiving the response message includes receiving the response message at the calling device.

In an embodiment, receiving the response message includes receiving the response message at an intermediate server, wherein the intermediate server is hosted by an organization that includes the resources.

In an embodiment, the method comprises generating a plurality of response options on the target device in response to delivery of the call request at the target device.

In an embodiment, the response options include at least one of accepting the call request, postponing the call request, generating a return data message including at least one of a text message and a voice message to the calling device, and initiating a voice call to the calling device.

In an embodiment, routing the call request to the target device includes routing in accordance with context information, the context information including at least one of a connectivity state and an availability profile of the target device.

In an embodiment, the connectivity state includes information of a state of connectivity of the target device to a communication network.

In an embodiment, the connectivity state includes at least one of a reachable state and an unreachable state, wherein the target device is in a reachable state when the target device is in a powered state and connected to a corresponding communication network, wherein the target device is in an unreachable state when the target device is one or more of in an un-powered state, disconnected from the communication network, and engaged in a voice call.

In an embodiment, the method comprises transferring context information of the target device to the calling device, wherein the context information includes at least one of presence information of the target device and a current availability state of the target device.

In an embodiment, the method comprises displaying the context information in at least one list of contact information of the target device.

In an embodiment, the method comprises automatically transferring updates of the context information of the target device to the calling device.

In an embodiment, the method comprises generating a query for information of the resources of the class.

In an embodiment, the method comprises monitoring a state of the call request and transferring state messages including the call request state to the calling device, wherein the state of the call request includes at least one of not sent, in transit, delivered, failed to deliver, and expired states.

In an embodiment, the response message accepts the call request and includes a prompt for use in initiating communication with the target device sending the response message.

In an embodiment, the call request is a data message that includes one or more of a text message and a voice message.

In an embodiment, routing the call request comprises automatically transferring contents of the call request to the target device in an electronic message, wherein the electronic message includes at least one of an electronic mail message, an instant message, a Short Message Service (SMS) message, a Multimedia Messaging Service (MMS) message, and an Enhanced Messaging Service (EMS) message.

In an embodiment, one or more of the calling device and the target devices include one or more of a mobile device, a wireless device, a wireline device, a voice over Internet Protocol (VOIP) device, a private branch exchange device, a soft client, and a desktop client.

In an embodiment, the resources of the class are unknown to a user of the calling device.

In an embodiment, the method comprises automatically determining the resources using data and status information of a plurality of contacts coupled to an enterprise.

In an embodiment, routing includes routing using information of a priority of the call request.

In an embodiment, routing includes routing using information of a subject of the call request.

In an embodiment, routing includes routing using expiry information of the call request.

The class-based call request routing further includes a system comprising: a server coupled to an enterprise and at least one communication network, the server including a facilitator; and a plurality of communication devices each including a client, wherein the client and the facilitator are configured to communicate to receive at a calling device information of a class, generate a call request addressed to a class group, the system identifying resources possessing an attribute of the class, route the call request to target devices of the resources, and establish communications between the calling device and the at least one target device using contents of a response message from at least one target device.

In an embodiment, the information of a class includes a selection of a class made via the calling device.

In an embodiment, the class group includes one or more resources having one or more attributes in common.

In an embodiment, the system comprises an integrated directory at the calling device, wherein the integrated directory includes the class group, wherein the integrated directory includes contact information of individual ones of the resources.

In an embodiment, receiving information of the class includes receiving a class selection via the integrated directory.

In an embodiment, the facilitator is configured to determine the resources from a plurality of contacts of an enterprise, wherein the enterprise includes the resources.

In an embodiment, the routing is parallel routing to target devices of a plurality of resources of the class group.

In an embodiment, the routing is sequential routing to target devices of each of a plurality of resources of the class group.

In an embodiment, the routing comprises: parallel routing to target devices of a first plurality of resources of the class group; and sequential routing to target devices of each of a second plurality of resources of the class group.

In an embodiment, the routing includes rule-based routing.

In an embodiment, rules of the rule-based routing are customized according to on one or more of the class and the class group.

In an embodiment, the routing includes routing according to use status of the resource.

In an embodiment, the routing includes routing according to class level of the resource.

In an embodiment, the routing includes routing according to expense level of the resource.

In an embodiment, the routing includes routing according to skill level of the resource.

In an embodiment, the routing includes routing according to availability of the resource.

In an embodiment, the system comprises at least one adapter coupled to the server and to at least one component of the enterprise, wherein the adapter is configured to receive information from the component and automatically generate from the information a configuration of the class group and assign resources as members of the class group.

In an embodiment, the adapter is configured to automatically update from the information the configuration of the class group and the assigned resources of the class group.

In an embodiment, the component of the enterprise includes one or more of a human resource system, a financial system, a customer relationship management system, a telephone system, a directory server, and an electronic mail server.

The class-based call request routing further includes a computer readable media including executable instructions which, when executed in a processing system, provides class-based call request routing by: receiving at a calling device information of a class; generating in response to the class a call request addressed to resources of a class group, wherein the resources possess an attribute of the class; routing the call request to target devices of the resources; receiving a response message from at least one target device; and establishing communications between the calling device and the at least one target device in response to the response message.

Aspects of the communications systems described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the communications systems include: microcontrollers with memory (such as electronically erasable programmable read-only memory (EEPROM)), embedded microprocessors, firmware, software, etc. Furthermore, aspects of the communications systems may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that components of the various systems and methods disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and others that may be used to transfer such formatted data and/or instructions through wireless, optical, or wired signaling media or any combination thereof.

Examples of transfers of such formatted data and/or instructions include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described systems and methods may be processed by a processing entity (e.g., one or more processors) within the computer system in conjunction with execution of one or more other computer programs.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the communications systems is not intended to be exhaustive or to limit the systems and methods described to the precise form disclosed. While specific embodiments of, and examples for, the communications systems are described herein for illustrative purposes, various equivalent modifications are possible within the scope of other communications systems and methods, as those skilled in the relevant art will recognize. The teachings of the communications systems provided herein can be applied to other processing systems and methods, not only for the systems and methods described above.

The elements and acts of the various embodiments described above can be combined to provide further embodiments. These and other changes can be made to the communications systems in light of the above detailed description.

In general, in the following claims, the terms used should not be construed to limit the communications systems to the specific embodiments disclosed in the specification and the claims, but should be construed to include all systems that operate under the claims. Accordingly, the communications systems are not limited by the disclosure, but instead the scope of the communications systems is to be determined entirely by the claims.

While certain aspects of the communications systems are presented below in certain claim forms, the inventors contemplate the various aspects of the communications systems in any number of claim forms. Accordingly, the inventors reserve the right to add additional claims after filing the application to pursue such additional claim forms for other aspects of the communications systems.

What is claimed is:

1. A method in a communication system including a plurality of mobile devices and a facilitator for establishing calls for the plurality of mobile devices, the method comprising:
   receiving, by the facilitator from a calling device, information of a class group having an attribute;
   determining a set of mobile devices that belong to the class group in response to receiving the information of the class group;
   determining by the facilitator:
      first mobile devices of the set of mobile devices that belong to the class group and that are available to accept a call; and,
      second mobile devices of the set of mobile devices that belong to the class group and that are unavailable to accept the call;
   generating, in response to the information of the class group, a call request;
   selecting, according to a routing rule, at least one target device from the first mobile devices of the set of mobile devices that belong to the class group and that are available to accept the call to receive the call request;
   routing the call request by the facilitator to the at least one selected target device of the first mobile devices;
   receiving by the facilitator a response message from a responding target device of the at least one target device, the response message indicating a willingness of the responding target device to accept a call from the calling device;
   notifying the calling device by the facilitator of the willingness of the responding target device to accept the call from the calling device; and,
   in response to the notifying by the facilitator to the calling device of the willingness of the responding target device to accept the call from the calling device, initiating by the calling device communication directly with the responding target device.

2. The method of claim 1, wherein the information of a class includes a selection of a class made via the calling device.

3. The method of claim 1, wherein the class group includes one or more resources having one or more attributes in common.

4. The method of claim 1, providing an integrated directory at the calling device.

5. The method of claim 4, wherein the integrated directory includes the class group.

6. The method of claim 4, wherein receiving information of the class includes receiving a class selection via the integrated directory.

7. The method of claim 4, wherein the integrated directory includes contact information of at least one of the resources.

8. The method of claim 1, comprising determining the resources from a plurality of contacts of an enterprise, wherein the enterprise includes the resources.

9. The method of claim 1, wherein the routing is parallel routing to a plurality of resources of the class group.

10. The method of claim 9, wherein the routing includes:
a first routing of the call request to at least one target device of a first set of resources; and
a second routing of the call request to at least one target device of a second set of resources.

11. The method of claim 1, wherein the routing is sequential routing to each of a plurality of resources of the class group.

12. The method of claim 11, comprising determining a hierarchy of the routing, wherein the hierarchy defines an order of the routing to the plurality of resources.

13. The method of claim 1, wherein the routing includes:
a first routing of the call request to a first set of target devices belonging to the class group;
waiting for a response to the call request from the first set of target devices; and
a second routing of the call request to a second set of target devices belonging to the class group in the absence of a response to the first routing.

14. The method of claim 13, wherein the second routing occurs upon termination of a time period since the first routing.

15. The method of claim 1, wherein the routing includes:
a first routing of the call request to at least one target device of a first set of resources; and
a second routing of the call request to at least one target device of a second set of resources in the absence of the response message to the first routing.

16. The method of claim 1, wherein the routing comprises:
parallel routing to a first plurality of resources of the class group; and
sequential routing to each of a second plurality of resources of the class group.

17. The method of claim 1, wherein the attribute includes one or more of a skill, job specialty code, job title, company, department, and division.

18. The method of claim 1, wherein rules of the rule-based routing are customized according to on one or more of the class and the class group.

19. The method of claim 1, wherein the routing includes routing according to use status of the resource.

20. The method of claim 19, wherein the routing includes routing first to one of relatively most-used resources and relatively least-used resources.

21. The method of claim 1, wherein the routing includes routing according to class level of the resource.

22. The method of claim 1, wherein the routing includes routing according to expense level of the resource.

23. The method of claim 1, wherein the routing includes routing according to skill level of the resource.

24. The method of claim 23, wherein the routing includes routing first to one of relatively higher-skilled resources and relatively lower-skilled resources.

25. The method of claim 1, wherein the routing includes routing according to availability of the resource, wherein the availability includes one or more of presence of the resource, reachable status of the resource, availability determined by a host system, and availability specified by the resource.

26. The method of claim 1, wherein the generating of the call request includes generating the call request at the calling device.

27. The method of claim 1, comprising providing a delivery confirmation to the calling device in response to delivery of the call request to the target devices.

28. The method of claim 1, wherein receiving the response message includes receiving the response message at the calling device.

29. The method of claim 1, wherein receiving the response message includes receiving the response message at an intermediate server, wherein the intermediate server is hosted by an organization that includes the resources.

30. The method of claim 1, comprising generating a plurality of response options on the target device in response to delivery of the call request at the target device.

31. The method of claim 30, wherein the response options include at least one of accepting the call request, postponing the call request, generating a return data message including at least one of a text message and a voice message to the calling device, and initiating a voice call to the calling device.

32. The method of claim 1, wherein routing the call request to the target device includes routing in accordance with context information, the context information including at least one of a connectivity state and an availability profile of the target device.

33. The method of claim 32, wherein the connectivity state includes information of a state of connectivity of the target device to a communication network.

34. The method of claim 32, wherein the connectivity state includes at least one of a reachable state and an unreachable state, wherein the target device is in a reachable state when the target device is in a powered state and connected to a corresponding communication network, wherein the target device is in an unreachable state when the target device is one or more of in an un-powered state, disconnected from the communication network, and engaged in a voice call.

35. The method of claim 1, comprising transferring context information of the target device to the calling device, wherein the context information includes at least one of presence information of the target device and a current availability state of the target device.

36. The method of claim 35, comprising displaying the context information in at least one list of contact information of the target device.

37. The method of claim 35, comprising automatically transferring updates of the context information of the target device to the calling device.

38. The method of claim 1, comprising generating a query for information of the resources of the class.

39. The method of claim 1, comprising monitoring a state of the call request and transferring state messages including the call request state to the calling device, wherein the state of the call request includes at least one of not sent, in transit, delivered, failed to deliver, and expired states.

40. The method of claim 1, wherein the response message accepts the call request and includes a prompt for use in initiating communication with the target device sending the response message.

41. The method of claim 1, wherein the call request is a data message that includes one or more of a text message and a voice message.

42. The method of claim 1, wherein routing the call request comprises automatically transferring contents of the call request to the target device in an electronic message, wherein the electronic message includes at least one of an electronic mail message, an instant message, a Short Message Service (SMS) message, a Multimedia Messaging Service (MMS) message, and an Enhanced Messaging Service (EMS) message.

43. The method of claim 1, wherein one or more of the calling device and the target devices include one or more of a mobile device, a wireless device, a wireline device, a voice over Internet Protocol (VOIP) device, a private branch exchange device, a soft client, and a desktop client.

44. The method of claim 1, wherein the resources of the class are unknown to a user of the calling device.

45. The method of claim 1, comprising automatically determining the resources using data and status information of a plurality of contacts coupled to an enterprise.

46. The method of claim 1, wherein routing includes routing using information of a priority of the call request.

47. The method of claim 1, wherein routing includes routing using information of a subject of the call request.

48. The method of claim 1, wherein routing includes routing using expiry information of the call request.

49. A system comprising:
a server coupled with an associated enterprise and at least one associated communication network, the server comprising a facilitator; and
wherein the facilitator is configured to communicate with a plurality of mobile communication devices, wherein the facilitator is operable to communicate with a calling device of the plurality of mobile communication devices to receive from the calling device information of a class having an attribute;
wherein the facilitator is configured to determine a first set of devices belonging to the class group and that are available to accept a call;
wherein the facilitator is configured to determine a second set of devices belonging to the class group and that are unavailable to accept a call;
wherein the facilitator is responsive to generate, in response to the information of the class, a call request addressed to a class group possessing the attribute of the class;
wherein the facilitator is configured to select, according to a routing rule, the at least one target device of the first set of devices to receive the call request, the at least one target device belonging to the class group and being currently available;
wherein the facilitator is configured to route the call request to the at least target device associated with the class group selected to receive the call request;
wherein the facilitator is configured to receive a response from a responding target device of the at least one target device indicating a willingness of the responding target device to receive a mobile call;
wherein the facilitator is configured to forward to the calling device a notification of the willingness of the responding target device to receive the mobile call; and
wherein the calling device is responsive to receiving the notification from the facilitator to initiate the mobile call directly between the calling device and the responding target device.

50. The system of claim 49, wherein the information of a class includes a selection of a class made via the calling device.

51. The system of claim 49, wherein the class group includes one or more resources having one or more attributes in common.

52. The system of claim 49, comprising an integrated directory at the calling device, wherein the integrated directory includes the class group, wherein the integrated directory includes contact information of individual ones of the resources.

53. The system of claim 52, wherein receiving information of the class includes receiving a class selection via the integrated directory.

54. The system of claim 49, wherein the facilitator is operable to determine the resources from a plurality of contacts of an enterprise, wherein the enterprise includes the resources.

55. The system of claim 49, wherein the routing is parallel routing to target devices of a plurality of resources of the class group.

56. The system of claim 49, wherein the routing is sequential routing to target devices of each of a plurality of resources of the class group.

57. The system of claim 49, wherein the routing comprises:
parallel routing to target devices of a first plurality of resources of the class group; and
sequential routing to target devices of each of a second plurality of resources of the class group.

58. The system of claim 49, wherein rules of the rule-based routing are customized according to on one or more of the class and the class group.

59. The system of claim 49, wherein the routing includes routing according to use status of the resource.

60. The system of claim 49, wherein the routing includes routing according to class level of the resource.

61. The system of claim 49, wherein the routing includes routing according to expense level of the resource.

62. The system of claim 49, wherein the routing includes routing according to skill level of the resource.

63. The system of claim 49, wherein the routing includes routing according to availability of the resource.

64. The system of claim 49, comprising at least one adapter coupled to the server and to at least one component of the enterprise, wherein the adapter is operable to receive information from the component and automatically generate from the information a configuration of the class group and assign resources as members of the class group.

65. The system of claim 64, wherein the adapter is operable to automatically update from the information the configuration of the class group and the assigned resources of the class group.

66. The system of claim 64, wherein the component of the enterprise includes one or more of a human resource system, a financial system, a customer relationship management system, a telephone system, a directory server, and an electronic mail server.

67. A non-transitory computer readable medium including executable instructions which, when executed in a processing system, provides class-based call request routing by:

receiving by a facilitator from a calling device information of a class having an attribute;

selecting, according to a routing rule at least one resource of the class group to receive a call request responsive to receiving the information from the calling device;

generating, in response to the information of the class, a call request;

determining first target devices that are available to accept a call;

determining second target devices that are unavailable to accept a call;

selecting, according to a routing rule, at least one target device from a set of mobile devices belonging to the class group and from the first target devices to an exclusion of the second target devices to receive the call request;

routing the call request by the facilitator to the at least one target device associated with the at least one resource;

receiving by the facilitator a response message from a responding target device of the at least one target device indicating an acceptance of the call request by the responding target device;

notifying the calling device by the facilitator of the acceptance of the call request by the responding target device; and in response to the notifying by the facilitator to the calling device of the acceptance of the call request by the responding target device, initiating by the calling device communication directly with the responding target device.

* * * * *